United States Patent
Tsai et al.

(10) Patent No.: US 10,455,531 B2
(45) Date of Patent: Oct. 22, 2019

(54) METHOD AND APPARATUS FOR IDENTIFYING UPLINK TIMING ADVANCE IN A WIRELESS COMMUNICATION SYSTEM

(71) Applicant: ASUSTek Computer Inc., Taipei (TW)

(72) Inventors: Hsin-Hsi Tsai, Taipei (TW); Yu-Hsuan Guo, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/797,483

(22) Filed: Oct. 30, 2017

(65) Prior Publication Data

US 2018/0124724 A1     May 3, 2018

Related U.S. Application Data

(60) Provisional application No. 62/415,816, filed on Nov. 1, 2016.

(51) Int. Cl.
*H04W 56/00*     (2009.01)
*H04W 74/08*     (2009.01)

(52) U.S. Cl.
CPC ....... *H04W 56/0005* (2013.01); *H04W 56/00* (2013.01); *H04W 74/0833* (2013.01)

(58) Field of Classification Search
CPC ............. H04W 56/0005; H04W 56/00; H04W 74/0833
See application file for complete search history.

(56) References Cited

U.S. PATENT DOCUMENTS

| 2015/0043455 | A1* | 2/2015 | Miklos | H04W 8/26 370/329 |
|---|---|---|---|---|
| 2016/0021648 | A1 | 1/2016 | Blankenship | |
| 2016/0192376 | A1 | 6/2016 | Lee | |
| 2017/0111226 | A1* | 4/2017 | Zhou | H04L 41/0893 |

FOREIGN PATENT DOCUMENTS

| CN | 102860120 | 8/2015 |
|---|---|---|
| EP | 2343935 | 11/2011 |
| JP | 2014531847 | 11/2014 |

(Continued)

OTHER PUBLICATIONS

European Search Report from corresponding EP Application No. 17199078.1, dated Mar. 27, 2018.

(Continued)

*Primary Examiner* — Chuong A Ngo
(74) *Attorney, Agent, or Firm* — Blue Capital Law Firm, P.C.

(57) ABSTRACT

A method and apparatus are disclosed from the perspective of a UE. In one embodiment, the method includes maintaining a first timing advance for a cell, wherein the first timing advance is associated with a first identifier. The method further includes performing a random access procedure in the cell. The method also includes receiving an initial value of a second timing advance for the cell via a random access response of the random access procedure. In addition, the method includes receiving a second identifier to associate with the second timing advance. Furthermore, the method includes maintaining the first timing advance and the second timing advance for the cell.

18 Claims, 27 Drawing Sheets

(56) References Cited

FOREIGN PATENT DOCUMENTS

| JP | 2015065485 | 4/2015 |
|----|------------|--------|
| KR | 1020110107807 | 10/2011 |
| WO | 2010079941 | 7/2010 |
| WO | 2016007937 | 7/2016 |
| WO | 2016144084 | 9/2016 |

OTHER PUBLICATIONS

Communication pursuant to Article 943(3) EPC from corresponding EP Application No. 17199078.1, dated Oct. 22, 2018.
Office Action from Taiwan Intellectual Property Office in corresponding TW Application No. 106137475, dated Sep. 28, 2019.
Notice of Submission of Opinion from Korean Patent Office in corresponding KR Application No. 10-2017-0142644, dated Feb. 26, 2019.
Notice of Reason for Rejection from Japan Patent Office in corresponding JP Application No. 2017-208727, dated Dec. 11, 2018.

* cited by examiner

_US 10,455,531 B2_

METHOD AND APPARATUS FOR IDENTIFYING UPLINK TIMING ADVANCE IN A WIRELESS COMMUNICATION SYSTEM

CROSS-REFERENCE TO RELATED APPLICATIONS

The present application claims the benefit of U.S. Provisional Patent Application Ser. No. 62/415,816 filed on Nov. 1, 2016, the entire disclosure of which is incorporated herein in its entirety by reference.

FIELD

This disclosure generally relates to wireless communication networks, and more particularly, to a method and apparatus for identifying uplink timing advance in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes maintaining a first timing advance for a cell, wherein the first timing advance is associated with a first identifier. The method further includes performing a random access procedure in the cell. The method also includes receiving an initial value of a second timing advance for the cell via a random access response of the random access procedure. In addition, the method includes receiving a second identifier to associate with the second timing advance. Furthermore, the method includes maintaining the first timing advance and the second timing advance for the cell.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162709, "Beam support in NR", Intel; RAN2#94 meeting minute; R2-162210, "Beam level management <-> Cell level mobility", Samsung; R2-164270, "General considerations on LTE-NR tight interworking", Huawei; TS 36.300 v 13.4.0, "Overall description; Stage 2"; TS 36.321 v 13.2.0, "E-UTRA; Media Access Control (MAC) protocol specification (Release 13)"; TS 36.214 v 13.2.0, "E-UTRA; Physical layer; Measurements (Release 13)"; TS 36.213 v 13.2.0, "E-UTRA; Physical layer procedures (Release 13)"; R2-163879, "RAN2 Impacts in HF-NR", MediaTek; R2-163471, "Cell concept in NR", CATT; R2-166826, "Random Access enhancements", Ericsson; RAN1#86 Chairman's Notes; and RAN#86bis Chairman's Notes. The standards and documents listed above are hereby expressly incorporated by reference in their entirety.

Figure 1:
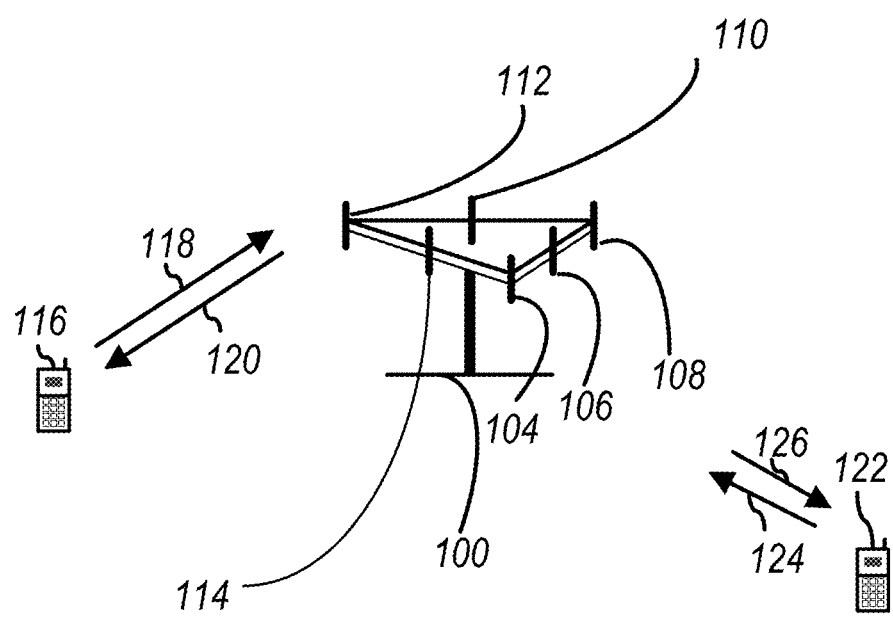
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
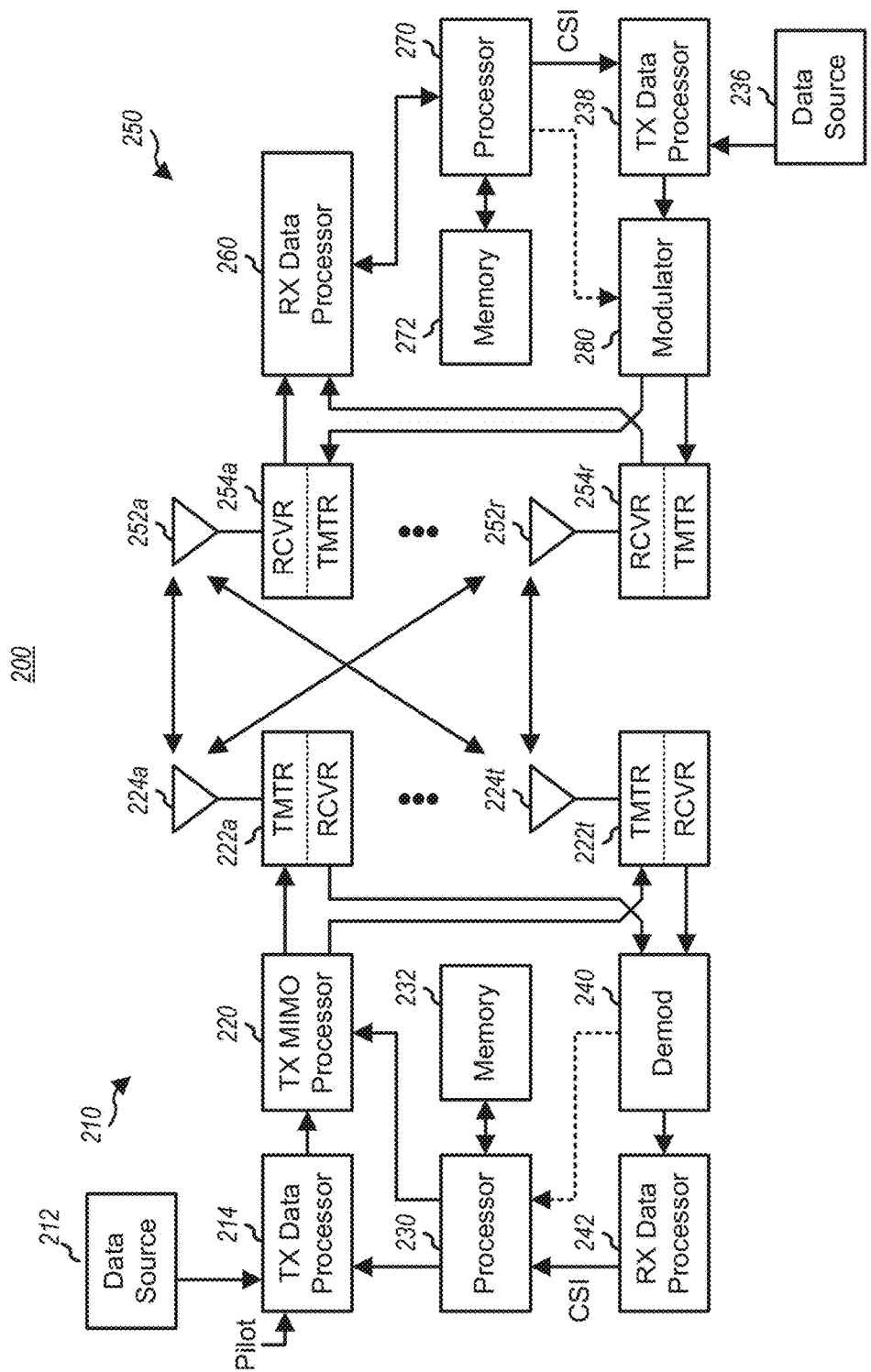
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
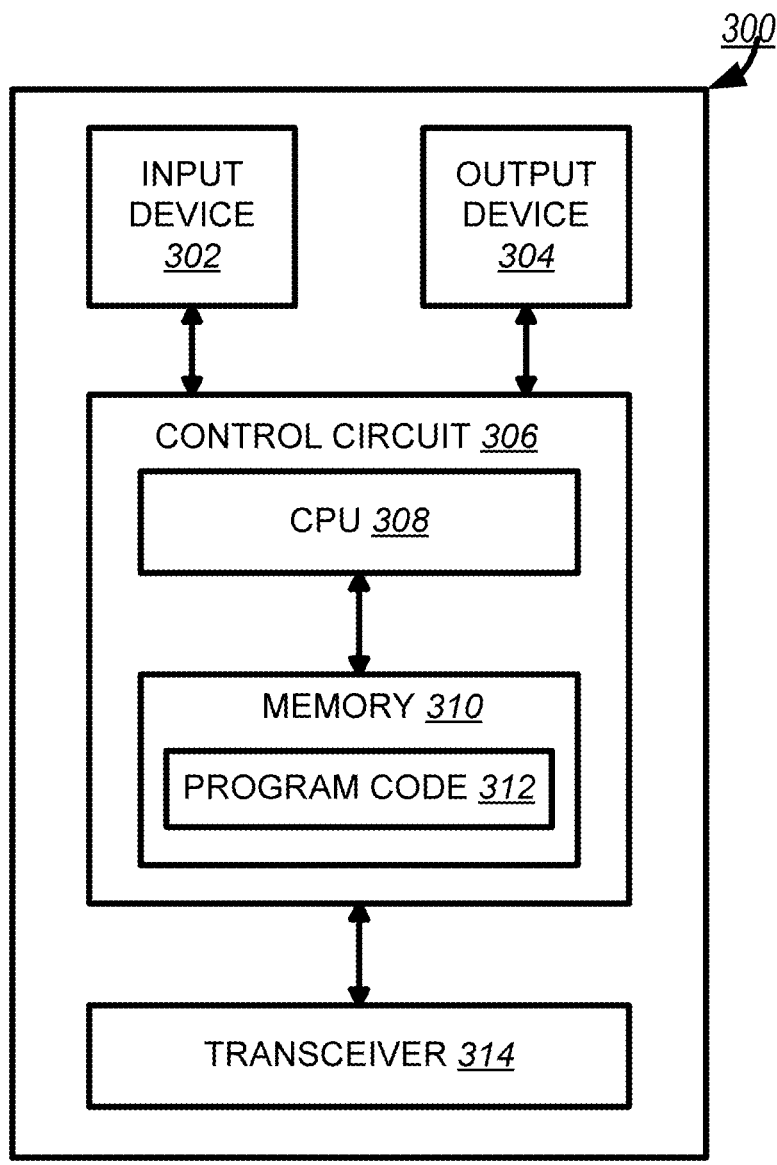
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
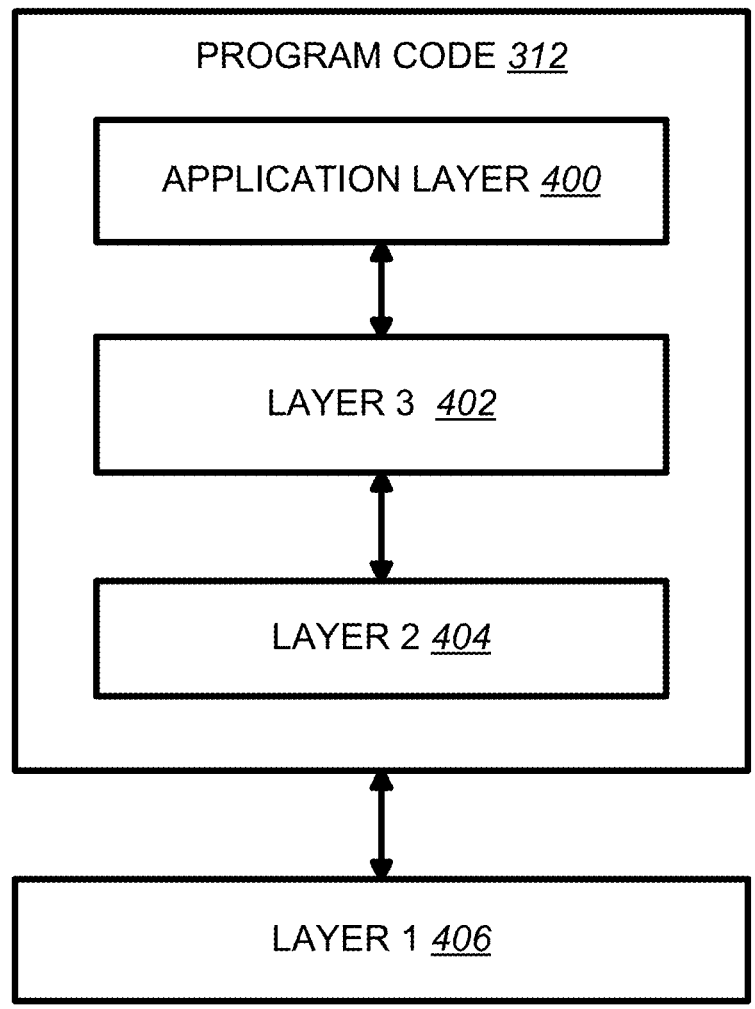
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e., 5G) access technology have been launched since March 2015. In general, the next generation access technology aims to support the following three families of usage scenarios for satisfying both the urgent market needs and the more long-term requirements set forth by the ITU-R IMT-2020:

eMBB (enhanced Mobile Broadband)
mMTC (massive Machine Type Communications)
URLLC (Ultra-Reliable and Low Latency Communications).

In general, an objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Figure 5:
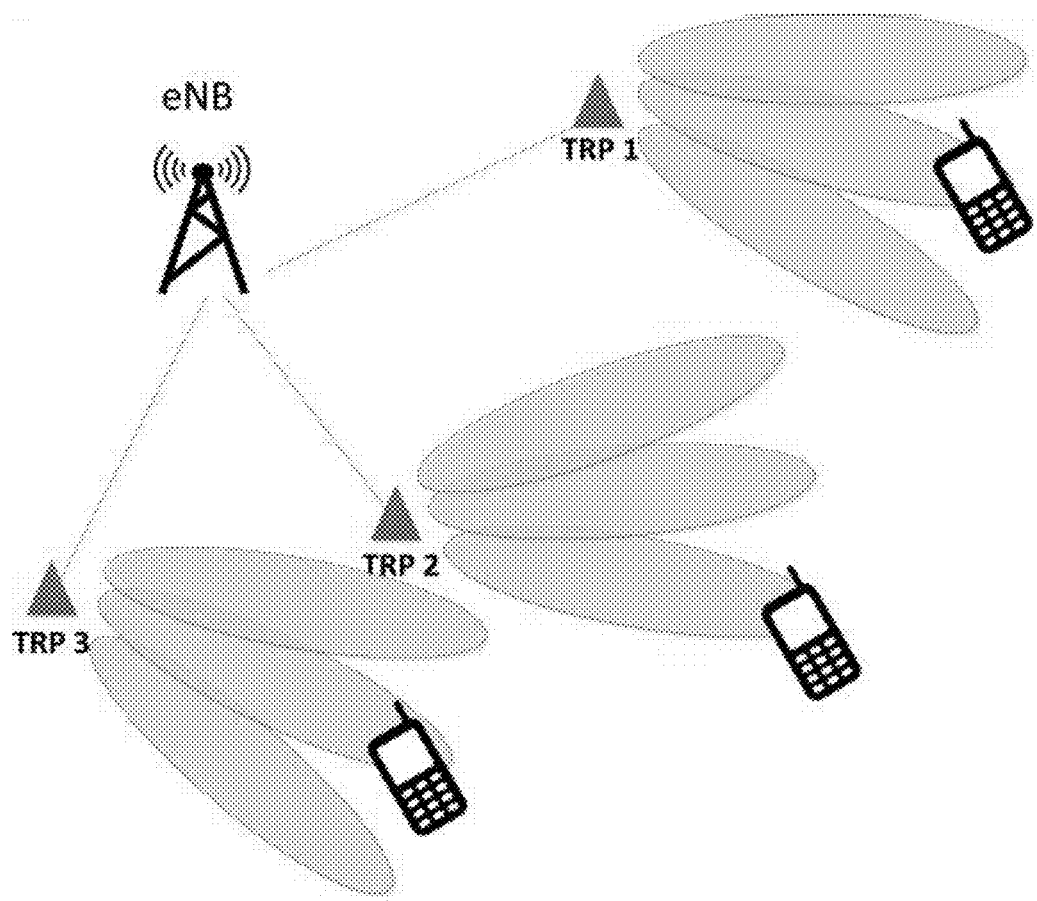
FIG. 5 is a reproduction of Figure 1 of 3GPP R2-162709.

Based on 3GPP R2-162709 and as shown in FIG. 5 (which is a reproduction of Figure 1, entitled "Beam concept in 5G", of 3GPP R2-162709), an eNB (or gNB) may have multiple TRPs (either centralized or distributed). Each TRP (Transmission/Reception Point) can form multiple beams. The number of beams and the number of simultaneous beams in the time/frequency domain depend on the number of antenna array elements and the RF (Radio Frequency) at the TRP.

Potential mobility type for NR can be listed as follows:
Intra-TRP mobility;
Inter-TRP mobility; and
Inter-NR eNB mobility.

Based on the 3GPP RAN2#94 meeting minutes, 1 NR eNB (or gNB) corresponds to 1 or many TRPs. There are two levels of network controlled mobility as follows:
RRC (Radio Resource Control) driven at "cell" level; and
Zero/Minimum RRC involvement, e.g., at MAC (Medium Access Control)/PHY (Physical).

Based on 3GPP R2-162210, the following principle of 2-level mobility handling may possibly be kept in 5G:
A) Cell level mobility
   a. Cell selection/reselection in IDLE, handover in CONN (Connected State)
   b. Handled by RRC in CONN state
B) Beam level management
   a. L1 handles appropriate selection of the TRP to use for a UE and the optimal beam direction 5G systems are expected to rely more heavily on "beam based mobility" to handle UE mobility, in addition to regular handover based UE mobility. Technologies like MIMO (Multiple Input Multiple Output), fronthauling, C-RAN (Cloud RAN), and NFV (Network Function Virtualization) will allow the coverage area controlled by one "5G Node" to grow, thus increasing the possibilities for beam level management and reducing the need for cell level mobility. All mobility within the coverage area of one 5G node could, in theory, be handled based on beam level management, which would leave handovers only to be used for mobility to the coverage area of another 5G Node.

Figure 6:
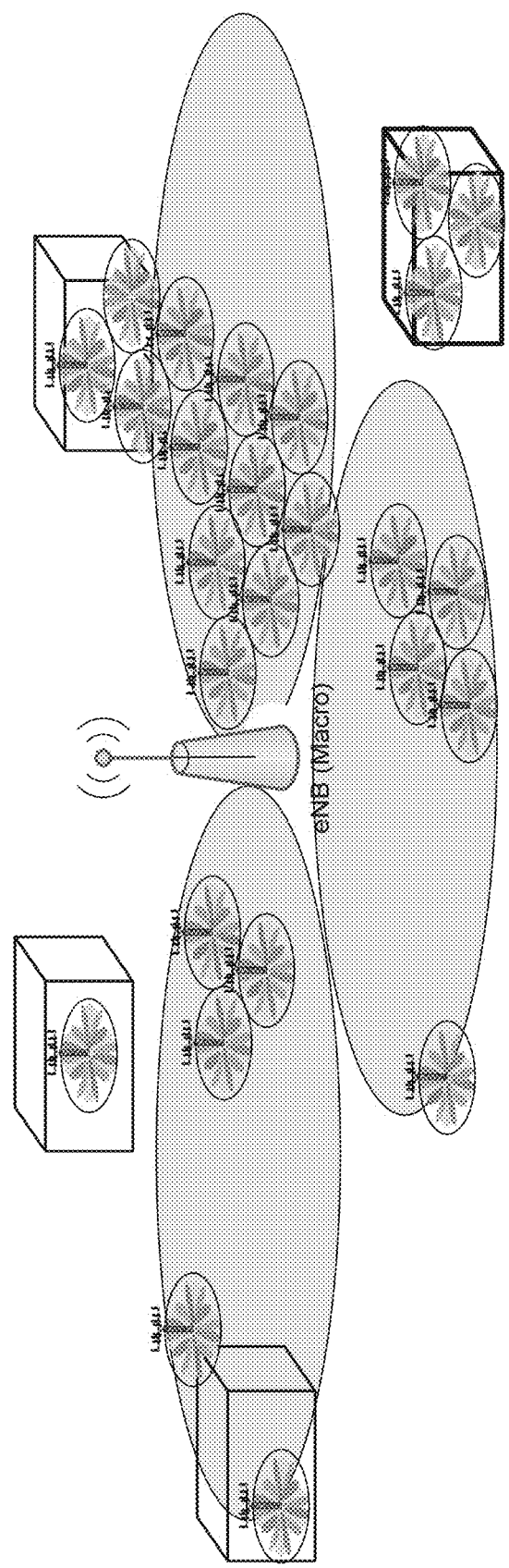
FIG. 6 is a reproduction of a portion of Figure 1 of 3GPP R2-163879.
Figure 7:
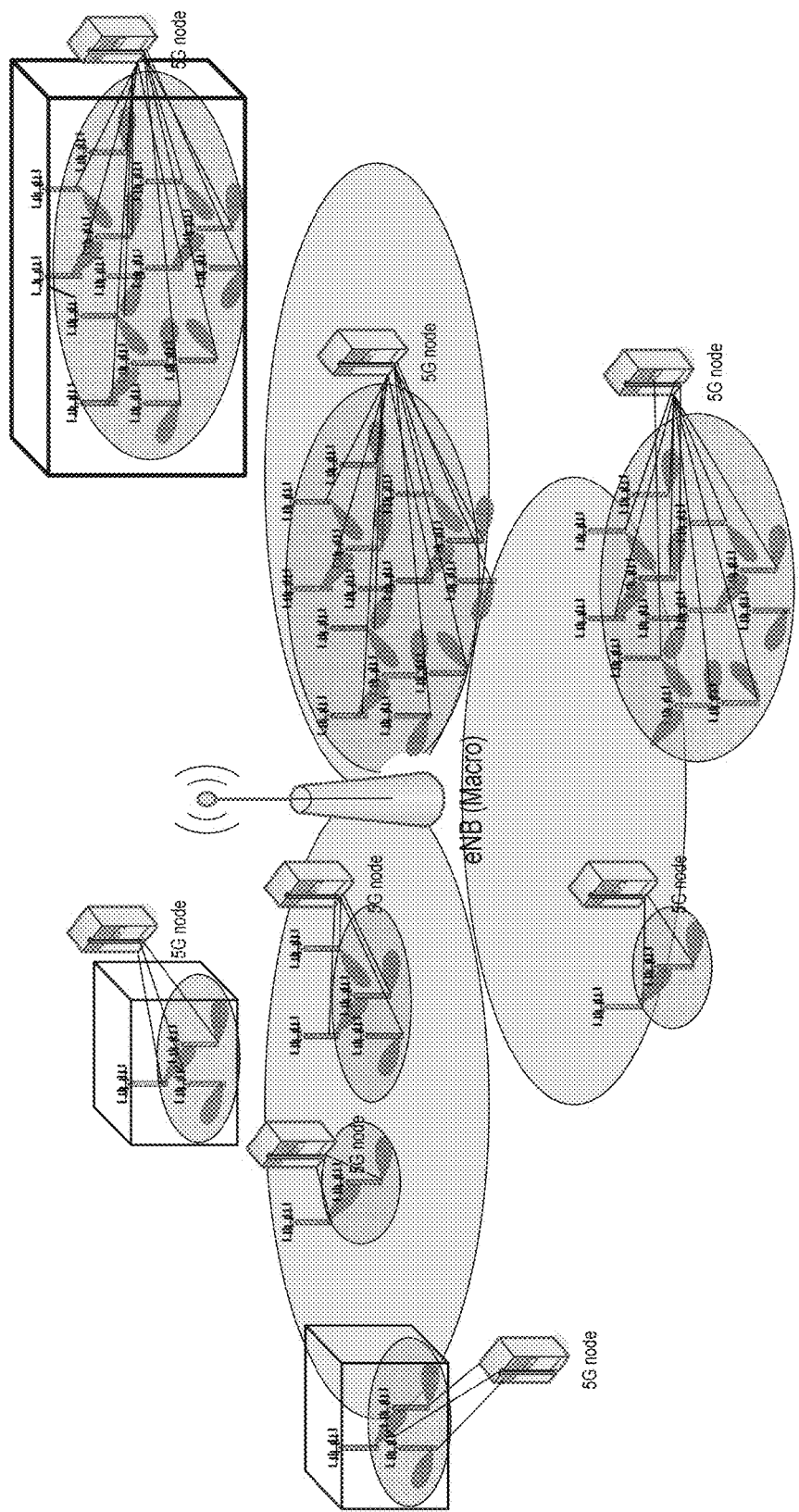
FIG. 7 is a reproduction of a portion of Figure 1 of 3GPP R2-163879.
Figure 8:
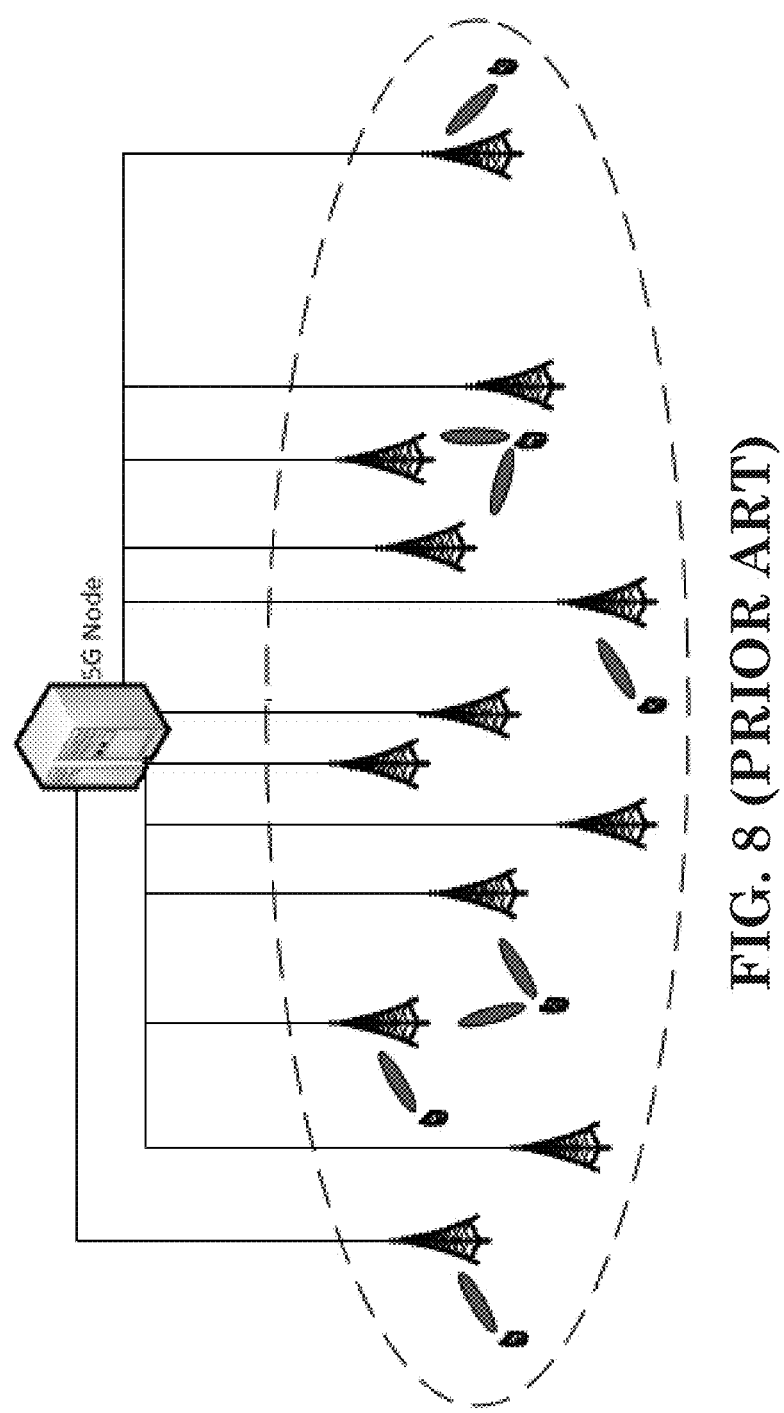
FIG. 8 is a reproduction of Figure 3 of 3GPP R2-162210.
Figure 9:
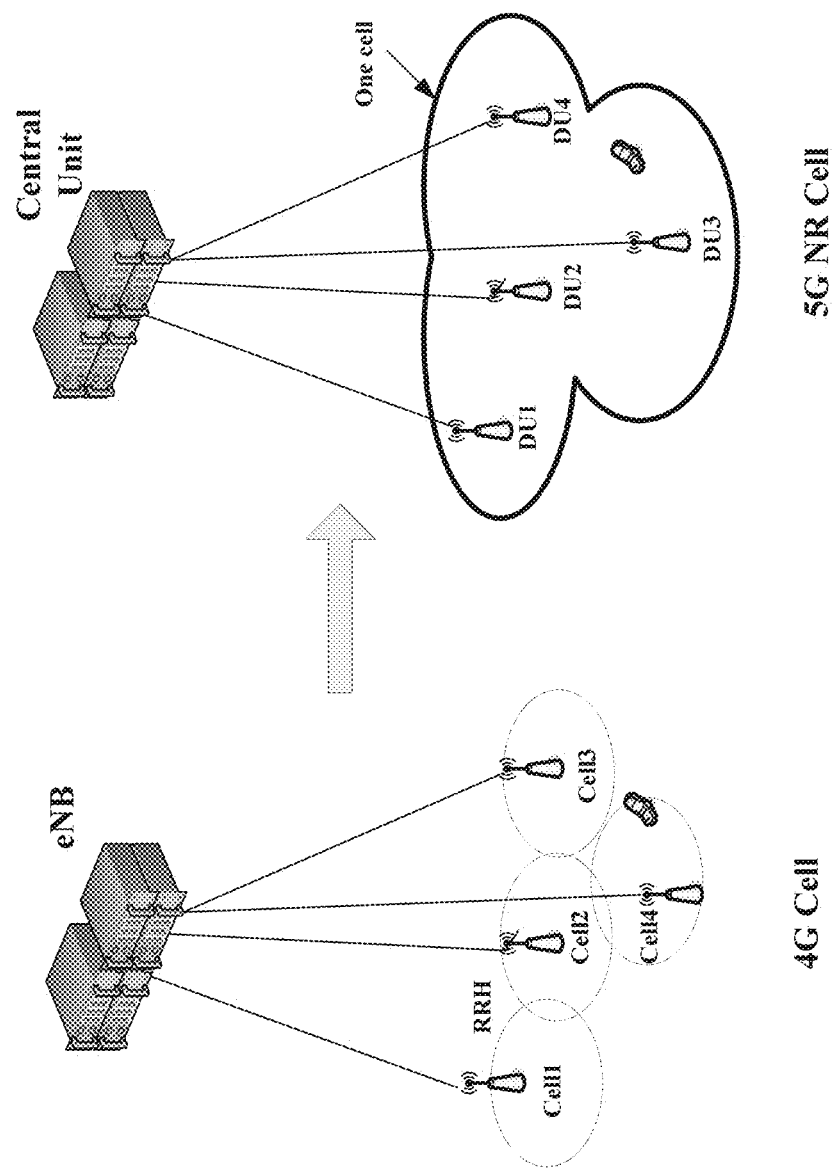
FIG. 9 is a reproduction of Figure 1 of 3GPP R2-163471.

FIGS. 6 to 9 show examples of the concept of a cell in 5G. FIG. 6 is a reproduction of a portion entitled "Different deployment scenarios with single TRP cell" of Figure 1 of 3GPP R2-163879. FIG. 6 shows a deployment with single-TRP cell. FIG. 7 is a reproduction of a portion entitled "Different deployment scenarios with multiple TRP cells" of Figure 1 of 3GPP R2-163879. FIG. 7 shows a deployment with multiple-TRP cell. FIG. 8 is a reproduction of Figure 3 (entitled "One 5G Cell") of 3GPP R2-162210. FIG. 8 shows one 5G cell comprising a 5G node with multiple TRPs. FIG. 9 is a reproduction of Figure 1 (entitled "LTE cell and NR cell") of 3GPP R2-163471. Figure 9 shows a comparison between a LTE cell and a NR cell.

In LTE, the network could estimate the uplink signal arrival time which can be used to calculate the required timing advance value and adjust the uplink transmission timing by sending the value of timing advance to the respective UE. Timing advance value is a negative offset between the start of a received downlink subframe and a transmitted uplink subframe at the UE. This offset at the UE is necessary to ensure that the downlink and uplink subframes are synchronized at the network.

3GPP TS 36.300 generally describes timing advance in LTE as follows:

5.2.7.3 Uplink Timing Control

The timing advance is derived from the UL received timing and sent by the eNB to the UE which the UE uses to advance/delay its timings of transmissions to the eNB so as to compensate for propagation delay and thus time align the transmissions from different UEs with the receiver window of the eNB.

The timing advance command for each TAG is on a per need basis with a granularity in the step size of 0.52 μs (16×$T_s$).

10.1.2.7 Timing Advance

In RRC_CONNECTED, the eNB is responsible for maintaining the timing advance. Serving cells having UL to which the same timing advance applies (typically corresponding to the serving cells hosted by the same receiver) and using the same timing reference cell are grouped in a timing advance group (TAG). Each TAG contains at least one serving cell with configured uplink, and the mapping of each serving cell to a TAG is configured by RRC. In case of DC, a TAG only includes cells that are associated to the same CG and the maximum number of TAG is 8.

For the pTAG the UE uses the PCell in MCG and the PSCell in SCG as timing reference. In a sTAG, the UE may use any of the activated SCells of this TAG as a timing reference cell, but should not change it unless necessary.

In some cases (e.g. during DRX), the timing advance is not necessarily always maintained and the MAC sublayer knows if the L1 is synchronised and which procedure to use to start transmitting in the uplink:
  as long as the L1 is non-synchronised, uplink transmission can only take place on PRACH.

For a TAG, cases where the UL synchronisation status moves from "synchronised" to "non-synchronised" include:
  Expiration of a timer specific to the TAG;
  Non-synchronised handover.

The synchronisation status of the UE follows the synchronisation status of the pTAG of MCG. The synchronisation status of the UE w.r.t. SCG follows the synchronisation status of the pTAG of SCG. When the timer associated with pTAG is not running, the timer associated with an sTAG in that CG shall not be running. Expiry of the timers associated with one CG does not affect the operation of the other CG. The value of the timer associated to the pTAG of MCG is either UE specific and managed through dedicated signalling between the UE and the eNB, or cell specific and indicated via broadcast information. In both cases, the timer is normally restarted whenever a new timing advance is given by the eNB for the pTAG:
  restarted to a UE specific value if any; or
  restarted to a cell specific value otherwise.

The value of the timer associated to a pTAG of SCG and the value of a timer associated to an sTAG of an MCG or an sTAG of SCG are managed through dedicated signalling between the UE and the eNB, and the timers associated to these TAGs can be configured with different values. The timers of these TAGs are normally restarted whenever a new timing advance is given by the eNB for the corresponding TAG.

Upon DL data arrival or for positioning purpose, a dedicated signature on PRACH can be allocated by the eNB to the UE. When a dedicated signature on PRACH is allocated, the UE shall perform the corresponding random access procedure regardless of its L1 synchronisation status.

Timing advance updates are signalled by the eNB to the UE in MAC PDUs.

In LTE, the MAC specification (3GPP TS 36.321) depicts the mechanism of maintaining UL timing advance for UE, and identifies the format of Timing Advance Command MAC Control Element and Random Access Response MAC Control Element. Two distinct types of Timing Advance with different length are introduced. One type of Timing Advance is absolute TA (11 bits), and the other type is relative TA (6 bits). An absolute TA is included in the Random Access Response MAC Control Element which could be used to indicate the initial or exact TA value. A relative TA is included in the Timing Advance Command MAC Control Element which is utilized to adjust the TA value.

3GPP TS 36.321 provides the following details:

5.2 Maintenance of Uplink Time Alignment

The MAC entity has a configurable timer timeAlignmentTimer per TAG. The timeAlignmentTimer is used to control how long the MAC entity considers the Serving Cells belonging to the associated TAG to be uplink time aligned. The MAC entity shall:
  when a Timing Advance Command MAC control element is received:
    apply the Timing Advance Command for the indicated TAG;
    start or restart the timeAlignmentTimer associated with the indicated TAG.
  when a Timing Advance Command is received in a Random Access Response message for a serving cell belonging to a TAG:
    if the Random Access Preamble was not selected by the MAC entity:
      apply the Timing Advance Command for this TAG;
      start or restart the timeAlignmentTimer associated with this TAG.
    else, if the timeAlignmentTimer associated with this TAG is not running:
      apply the Timing Advance Command for this TAG;
      start the timeAlignmentTimer associated with this TAG;
      when the contention resolution is considered not successful as described in subclause 5.1.5, stop timeAlignmentTimer associated with this TAG.
    else:
      ignore the received Timing Advance Command.
  when a timeAlignmentTimer expires:
    if the timeAlignmentTimer is associated with the pTAG:
      flush all HARQ buffers for all serving cells;
      notify RRC to release PUCCH for all serving cells;
      notify RRC to release SRS for all serving cells;
      clear any configured downlink assignments and uplink grants;
      consider all running timeAlignmentTimers as expired;
    else if the timeAlignmentTimer is associated with an STAG, then for all Serving Cells belonging to this TAG:
      flush all HARQ buffers;
      notify RRC to release SRS;
      notify RRC to release PUCCH, if configured.

When the MAC entity stops uplink transmissions for an SCell due to the fact that the maximum uplink transmission timing difference (as described in subclause 7.9.2 of TS 36.133) or the maximum uplink transmission timing difference the UE can handle between TAGs of any MAC entity of the UE is exceeded, the MAC entity considers the timeAlignmentTimer associated with the SCell as expired. The MAC entity shall not perform any uplink transmission on a Serving Cell except the Random Access Preamble transmission when the timeAlignmentTimer associated with the TAG to which this Serving Cell belongs is not running. Furthermore, when the timeAlignmentTimer associated with the pTAG is not running, the MAC entity shall not perform any uplink transmission on any Serving Cell except the Random Access Preamble transmission on the SpCell.

The MAC entity shall not perform any sidelink transmission which is performed based on UL timing of the corresponding serving cell and any associated SCI transmissions when the corresponding timeAlignmentTimer is not running.

NOTE: A MAC entity stores or maintains $N_{TA}$ upon expiry of associated timeAlignmentTimer, where $N_{TA}$ is defined in [7]. The MAC entity applies a received Timing Advance Command MAC control element and starts associated timeAlignmentTimer also when the timeAlignmentTimer is not running.

6.1.3.5 Timing Advance Command MAC Control Element

The Timing Advance Command MAC control element is identified by MAC PDU subheader with LCID as specified in table 6.2.1-1.

It has a fixed size and consists of a single octet defined as follows (figure 6.1.3.5-1):

TAG Identity (TAG Id): This field indicates the TAG Identity of the addressed TAG. The TAG containing the SpCell has the TAG Identity 0. The length of the field is 2 bits;

Timing Advance Command: This field indicates the index value $T_A$ (0, 1, 2 ... 63) used to control the amount of timing adjustment that MAC entity has to apply (see subclause 4.2.3 of [2]). The length of the field is 6 bits.

Figure 23:
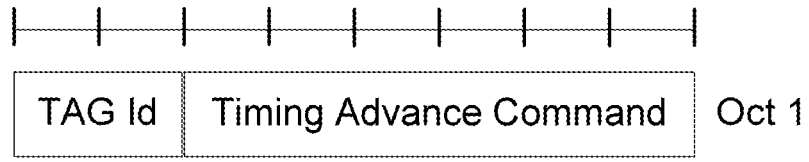
FIG. 23 is a reproduction of Figure 6.1.3.5-1 of 3GPP TS 36.321 v 13.2.0.

[Figure 6.1.3.5-1 of 3GPP TS 36.321 v 13.2.0, entitled "Timing Advance Command MAC control element", is reproduced as FIG. 23]

6.1.5 MAC PDU (Random Access Response)

A MAC PDU consists of a MAC header and zero or more MAC Random Access Responses (MAC RAR) and optionally padding as described in figure 6.1.5-4.

The MAC header is of variable size.

A MAC PDU header consists of one or more MAC PDU subheaders; each subheader corresponding to a MAC RAR except for the Backoff Indicator subheader. If included, the Backoff Indicator subheader is only included once and is the first subheader included within the MAC PDU header.

A MAC PDU subheader consists of the three header fields E/T/RAPID (as described in figure 6.1.5-1) but for the Backoff Indicator subheader which consists of the five header field E/T/R/R/BI (as described in figure 6.1.5-2).

A MAC RAR consists of the four fields R/Timing Advance Command/UL Grant/Temporary C-RNTI (as described in figures 6.1.5-3 and 6.1.5-3a). For BL UEs and UEs in enhanced coverage in enhanced coverage level 2 or 3 (see subclause 6.2 in [2]) the MAC RAR in figure 6.1.5-3a is used, otherwise the MAC RAR in figure 6.1.5-3 is used. Padding may occur after the last MAC RAR. Presence and length of padding is implicit based on TB size, size of MAC header and number of RARs.

Figure 24:
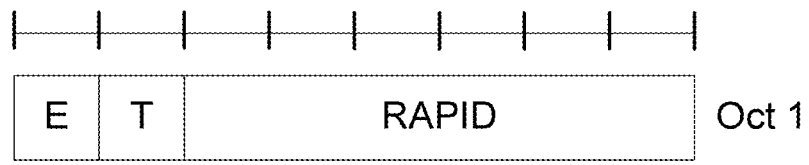
FIG. 24 is a reproduction of Figure 6.1.5-1 of 3GPP TS 36.321 v 13.2.0.

[Figure 6.1.5-1 of 3GPP TS 36.321 v 13.2.0, entitled "E/T/RAPID MAC subheader", is reproduced as FIG. 24]

Figure 25:
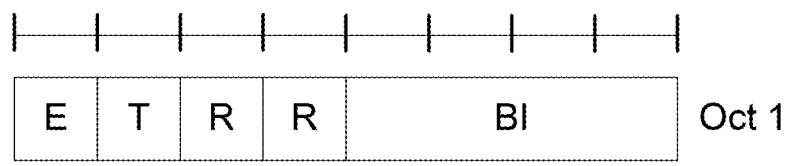
FIG. 25 is a reproduction of Figure 6.1.5-2 of 3GPP TS 36.321 v 13.2.0.

[Figure 6.1.5-2 of 3GPP TS 36.321 v 13.2.0, entitled "E/T/R/R/BI MAC subheader", is reproduced as FIG. 25]

Figure 26:
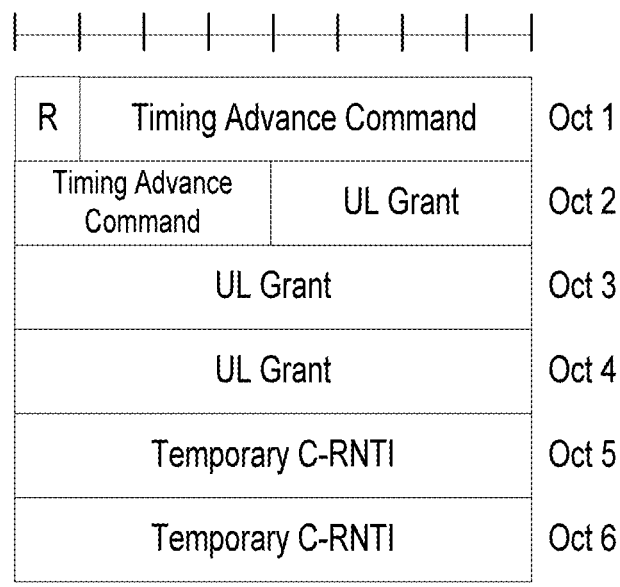
FIG. 26 is a reproduction of Figure 6.1.5-3 of 3GPP TS 36.321 v 13.2.0.

[Figure 6.1.5-3 of 3GPP TS 36.321 v 13.2.0, entitled "MAC RAR", is reproduced as FIG. 26]

The corresponding adjustment of the uplink transmission timing is specified in LTE PHY specification (3GPP TS 36.213) as follows:

4.2 Timing Synchronization 4.2.3 Transmission Timing Adjustments

Upon reception of a timing advance command for a TAG containing the primary cell or PSCell, the UE shall adjust uplink transmission timing for PUCCH/PUSCH/SRS of the primary cell or PSCell based on the received timing advance command.

The UL transmission timing for PUSCH/SRS of a secondary cell is the same as the primary cell if the secondary cell and the primary cell belong to the same TAG. If the primary cell in a TAG has a frame structure type 1 and a secondary cell in the same TAG has a frame structure type 2, UE may assume that $N_{TA} \geq 624$.

If the UE is configured with a SCG, the UL transmission timing for PUSCH/SRS of a secondary cell other than the PSCell is the same as the PScell if the secondary cell and the PSCell belong to the same TAG.

Upon reception of a timing advance command for a TAG not containing the primary cell or PSCell, if all the serving cells in the TAG have the same frame structure type, the UE shall adjust uplink transmission timing for PUSCH/SRS of all the secondary cells in the TAG based on the received timing advance command where the UL transmission timing for PUSCH/SRS is the same for all the secondary cells in the TAG.

Upon reception of a timing advance command for a TAG not containing the primary cell or PSCell, if a serving cell in the TAG has a different frame structure type compared to the frame structure type of another serving cell in the same TAG, the UE shall adjust uplink transmission timing for PUSCH/SRS of all the secondary cells in the TAG by using $N_{TAoffset}=624$ regardless of the frame structure type of the serving cells and based on the received timing advance command where the UL transmission timing for PUSCH/SRS is the same for all the secondary cells in the TAG.

The timing advance command for a TAG indicates the change of the uplink timing relative to the current uplink timing for the TAG as multiples of 16.

In case of random access response, an 11-bit timing advance command, $T_A$, for a TAG indicates $N_{TA}$ values by index values of $T_A=0, 1, 2, \ldots, 256$ if the UE is configured with a SCG, and $T_A=0, 1, 2, \ldots, 1282$ otherwise, where an amount of the time alignment for the TAG is given by $N_{TA}=T_A \times 16$.

In other cases, a 6-bit timing advance command, $T_A$, for a TAG indicates adjustment of the current $N_{TA}$ value, $N_{TA,old}$, to the new $N_{TA}$ value, $N_{TA,new}$, by index values of $T_A=0, 1, 2, \ldots, 63$, where $N_{TA,new}=N_{TA,old}+(T_A-31)\times 16$. Here, adjustment of $N_{TA}$ value by a positive or a negative amount indicates advancing or delaying the uplink transmission timing for the TAG by a given amount respectively.

For a timing advance command received on subframe n, the corresponding adjustment of the uplink transmission timing shall apply from the beginning of subframe n+6. For serving cells in the same TAG, when the UE's uplink PUCCH/PUSCH/SRS transmissions in subframe n and subframe n+1 are overlapped due to the timing adjustment, the UE shall complete transmission of subframe n and not transmit the overlapped part of subframe n+1.

If the received downlink timing changes and is not compensated or is only partly compensated by the uplink timing adjustment without timing advance command, the UE changes $N_{TA}$ accordingly.

In LTE, random access procedure is performed for the following events related to the PCell (as discussed in 3GPP TS 36.300):

Initial access from RRC_IDLE;
RRC Connection Re-establishment procedure;
Handover;
DL (Downlink) data arrival during RRC_CONNECTED requiring random access procedure:

E.g., when UL (Uplink) synchronisation status is "non-synchronised".

UL data arrival during RRC_CONNECTED requiring random access procedure:
  E.g., when UL synchronisation status is "non-synchronised" or there are no PUCCH (Physical Uplink Control Chanel) resources for SR (Scheduling Request) available.

For positioning purpose during RRC_CONNECTED requiring random access procedure;
  E.g., when timing advance is needed for UE positioning.

The random access procedure is also performed on a SCell to establish time alignment for the corresponding sTAG (Secondary Timing Advance Group).

Furthermore, the random access procedure takes two distinct forms:
  Contention based (applicable to first five events);
  Non-contention based (applicable to only handover, DL data arrival, positioning and obtaining timing advance alignment for a sTAG).

Normal DL/UL transmission can take place after the random access procedure.

In LTE two types of RA procedure are defined: contention-based and contention-free (or non-contention based).

Figure 10:
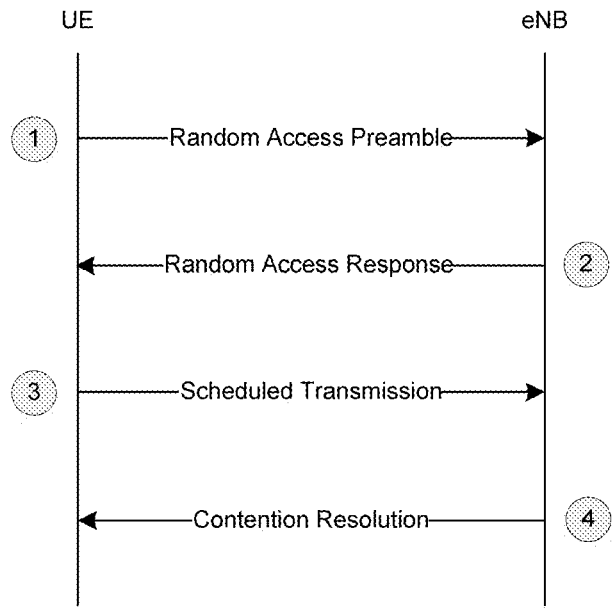
FIG. 10 is a reproduction of Figure 10.1.5.1-1 of 3GPP TS 36.300 v 13.4.0.

As illustrated in FIG. 10, which is a reproduction of Figure 10.1.5.1-1 of 3GPP TS 36.300 v 13.4.0, the four steps of the contention based random access procedures are:

1) Random Access Preamble on RACH (Random Access Channel) in uplink (Msg1):
  There are two possible groups defined and one is optional. If both groups are configured, the size of message 3 and the pathloss are used to determine which group a preamble is selected from. The group to which a preamble belongs provides an indication of the size of the message 3 and the radio conditions at the UE. The preamble group information along with the necessary thresholds are broadcasted on system information.

2) Random Access Response generated by MAC (Medium Access Control) on DL-SCH (Msg2):
  Semi-synchronous (within a flexible window of which the size is one or more TTI) with message 1;
  No HARQ (Hybrid Automatic Repeat Request);
  Addressed to RA-RNTI (Random Access-Radio Network Temporary Identifier) on PDCCH (Physical Downlink Control Channel);
  Conveys at least RA-preamble identifier, Timing Alignment information for the pTAG (primary Timing Alignment Group), initial UL grant and assignment of Temporary C-RNTI (which may or may not be made permanent upon Contention Resolution);
  Intended for a variable number of UEs in one DL-SCH (Downlink Shared Channel) message.

3) First scheduled UL transmission on UL-SCH (Msg3):
  Uses HARQ;
  Size of the transport blocks depends on the UL grant conveyed in step 2.
  For initial access:
    Conveys the RRC Connection Request generated by the RRC layer and transmitted via CCCH (Common Control Channel);
    Conveys at least NAS (Non-Access Stratum) UE identifier but no NAS message;
    RLC (Radio Link Control) TM (Transport Mode): no segmentation.
  For RRC Connection Re-establishment procedure:
    Conveys the RRC Connection Re-establishment Request generated by the RRC layer and transmitted via CCCH;
    RLC TM: no segmentation;
    Does not contain any NAS message.
  After handover, in the target cell:
    Conveys the ciphered and integrity protected RRC Handover Confirm generated by the RRC layer and transmitted via DCCH (Dedicated Control Channel);
    Conveys the C-RNTI (Cell Radio Network Temporary Identifier) of the UE (which was allocated via the Handover Command);
    Includes an uplink Buffer Status Report when possible.
  For other events:
    Conveys at least the C-RNTI of the UE.

4) Contention Resolution on DL (Msg4):
  Early contention resolution shall be used i.e. eNB does not wait for NAS reply before resolving contention;
  Not synchronised with message 3;
  HARQ is supported;
  Addressed to:
    The Temporary C-RNTI on PDCCH for initial access and after radio link failure;
    The C-RNTI on PDCCH for UE in RRC_CONNECTED.
  HARQ feedback is transmitted only by the UE which detects its own UE identity, as provided in message 3, echoed in the Contention Resolution message;
  For initial access and RRC Connection Re-establishment procedure, no segmentation is used (RLC-TM).

The Temporary C-RNTI is promoted to C-RNTI for a UE which detects RA success and does not already have a C-RNTI. The Temporary C-RNTI is dropped by others. If a UE detects RA success and already has a C-RNTI, the UE resumes using its C-RNTI.

Figure 11:
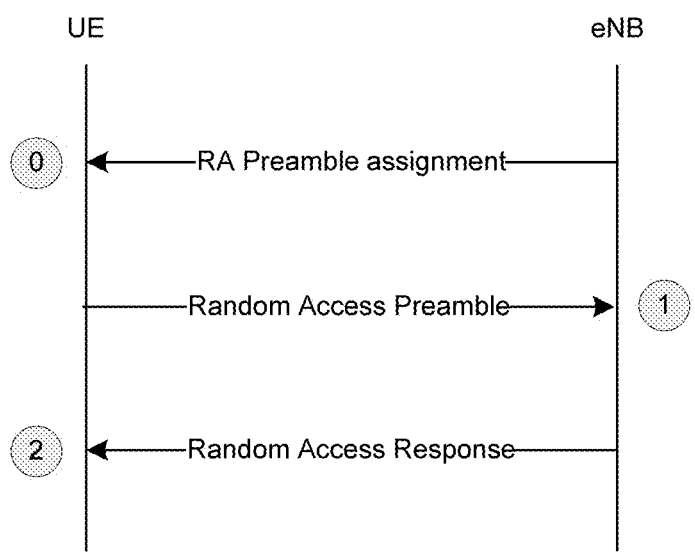
FIG. 11 is a reproduction of Figure 10.1.5.2-1 of 3GPP TS 36.300 v 13.4.0.

As illustrated in FIG. 11, which is a reproduction of Figure 10.1.5.2-1 of 3GPP TS 36.300 v 13.4.0, the three steps of the non-contention based random access procedures are:

0) Random Access Preamble assignment via dedicated signalling in DL (Msg0):
  eNB assigns to UE a non-contention Random Access Preamble (a Random Access Preamble not within the set sent in broadcast signalling).
  Signalled via:
    HO command generated by target eNB and sent via source eNB for handover;
    PDCCH in case of DL data arrival or positioning;
    PDCCH for initial UL time alignment for a sTAG (secondary Timing Alignment Group).

1) Random Access Preamble on RACH in uplink (Msg1):
  UE transmits the assigned non-contention Random Access Preamble.

2) Random Access Response on DL-SCH (Msg2):
  Semi-synchronous (within a flexible window of which the size is two or more TTIs) with message 1;
  No HARQ;
  Addressed to RA-RNTI on PDCCH;
  Conveys at least:
    Timing Alignment information and initial UL grant for handover;
    Timing Alignment information for DL data arrival;
    RA-preamble identifier;
    Intended for one or multiple UEs in one DL-SCH message.

Figure 12:
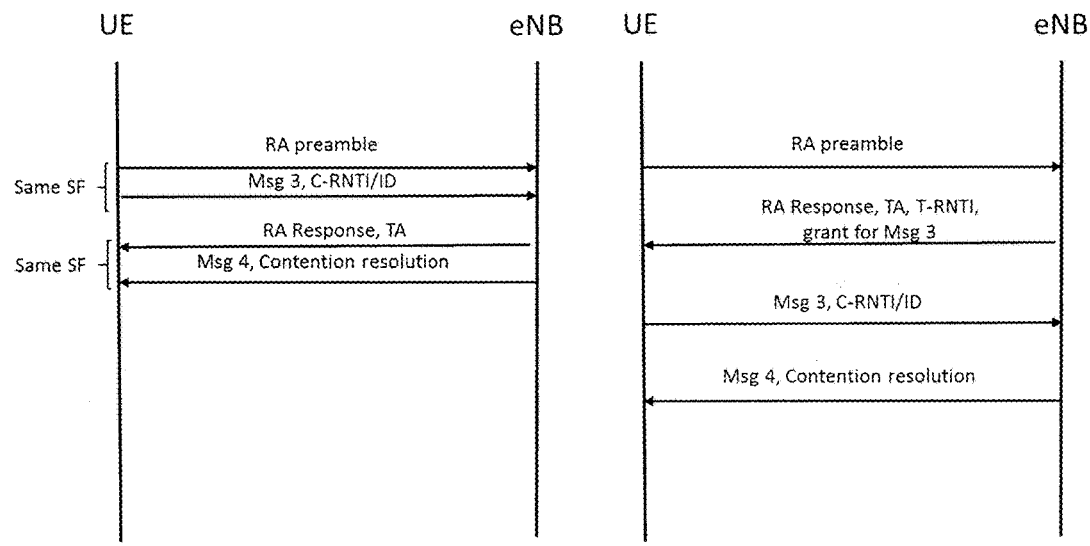
FIG. 12 is a reproduction of Figure 1 of 3GPP R2-166826.

Based on outcome of RAN1 #86 (discussed in 3GPP RAN1#86 Chairman's Notes) and #86 bis (discussed in 3GPP RAN1#86bis Chairman's Notes) meeting, a two-step Random Access in NR (New Radio) will be studied. 3GPP R2-166826 discusses some implications and issues for RAN 2. The agreements in more detail are as follows:

- RACH procedure, including RACH preamble (Msg. 1), random access response (Msg. 2), message 3, and message 4, is at least assumed for NR from RAN1 perspective
- Simplified RACH procedure, e.g., Msg. 1 (UL) and Msg. 2 (DL), should be further studied
    - Details on Msg. 1 and Msg. 2 are FFS
    - Study should include comparison with the above procedure (first bullet)
- RAN1 is studying and some companies see potential benefits of a simplified RACH procedure consisting of two main steps (Msg1 and Msg2) for UEs
- RAN1 has discussed the following:
    - The use of a UE identity in Msg 1
    - Msg 2: RA response that is addressed to the UE identity in Msg 1
    - FFS (For Further Study) on the definition and choice of the UE identity
    - FFS on the applicability scenarios of simplified RACH procedure In the two-step RA (Random Access), the preamble and a message corresponding to Msg 3 in the 4 step RA are transmitted in the same subframe or possibly in consecutive subframes (at least in the same burst). The Msg3 part is sent on a dedicated resource, corresponding to the specific preamble. This means that both the preamble and the Msg3 face contention. However, one could consider tying non-colliding time/frequency resources to different preambles. As a consequence, typically either both Msg1 and Msg3 succeed or both collide. As shown in FIG. 12 (which is a reproduction of Figure 1 of 3GPP R2-166826), the eNB will respond with a TA (which by assumption should not be needed or just give very minor updates) and a Msg4 for contention resolution upon successful reception of the preamble and Msg3. The preamble can also be used to aid the channel estimation for Msg3.

One or multiple of following terminologies may be used hereafter:

- BS (Base Station): a network central unit in NR which is used to control one or multiple TRPs which are associated with one or multiple cells. Communication between BS and TRP(s) is via fronthaul. BS could also be referred to as central unit (CU), eNB, gNB, or NodeB.
- TRP (Transmission/Reception Point): a transmission and reception point provides network coverage and directly communicates with UEs. TRP could also be referred to as distributed unit (DU).
- Cell: a cell is composed of one or multiple associated TRPs, i.e., coverage of the cell is composed of coverage of all associated TRP(s). One cell is controlled by one BS. Cell could also be referred to as TRP group (TRPG).
- Beam sweeping: In order to cover all possible directions for transmission and/or reception, a number of beams is required. Since it is not possible to generate all these beams concurrently, beam sweeping means to generate a subset of these beams in one time interval and change generated beam(s) in other time interval(s), i.e., changing beam in time domain. So, all possible directions can be covered after several time intervals.
- Serving beam: serving beam for a UE is a beam generated by network, e.g., TRP, which is used to communicate with the UE, e.g., for transmission and/or reception.

One or multiple of following assumptions for network side may be used hereafter:

- NR using beamforming could be standalone, i.e., UE can directly camp on or connect to NR.
- NR using beamforming and NR not using beamforming could coexist, e.g., in different cells.
- TRP would apply beamforming to both data and control signaling transmissions and receptions, if possible and beneficial.
    - Number of beams generated concurrently by TRP depends on TRP capability, e.g., the maximum number of beams generated concurrently by different TRPs in the same cell may be the same while the maximum number of beams generated concurrently by different TRPs in different cells may be different.
    - Beam sweeping is necessary, e.g., for the control signaling to be provided in every direction.
- Downlink timing of TRPs in the same cell are synchronized.
- RRC layer of network side is in BS.
- TRP should support both UEs with UE beamforming and UEs without UE beamforming, e.g., due to different UE capabilities or UE releases.

One or multiple of following assumptions for UE side may be used hereafter:

- UE may perform beamforming for reception and/or transmission, if possible and beneficial.
    - Number of beams generated concurrently by UE depends on UE capability, e.g., generating more than one beam is possible.
    - Beam(s) generated by UE is wider than beam(s) generated by eNB, gNB, or TRP.
    - Beam sweeping for transmission and/or reception is generally not necessary for user data but may be necessary for other signaling, e.g., to perform measurement.
    - (For hybrid beamforming) UE may not support all beam combinations, e.g. some beams could not be generated concurrently.
    - Beams may be distinguishable from reference signals.
- Not every UE supports UE beamforming, e.g., due to UE capability or UE beamforming is not supported in NR first (few) release(s).
- One UE is possible to generate multiple UE beams concurrently and to be served by multiple serving beams from one or multiple TRPs of the same cell.
    - Same or different (DL or UL) data could be transmitted on the same radio resource via different beams for diversity or throughput gain.
- There are at least two UE (RRC) states: connected state (or called active state) and non-connected state (or called inactive state or idle state).
- UE initially accesses one TRP of the cell and then other TRPs could be added to serve the UE.
- Concurrent UL transmissions to multiple TRPs are allowed.

Figure 13:
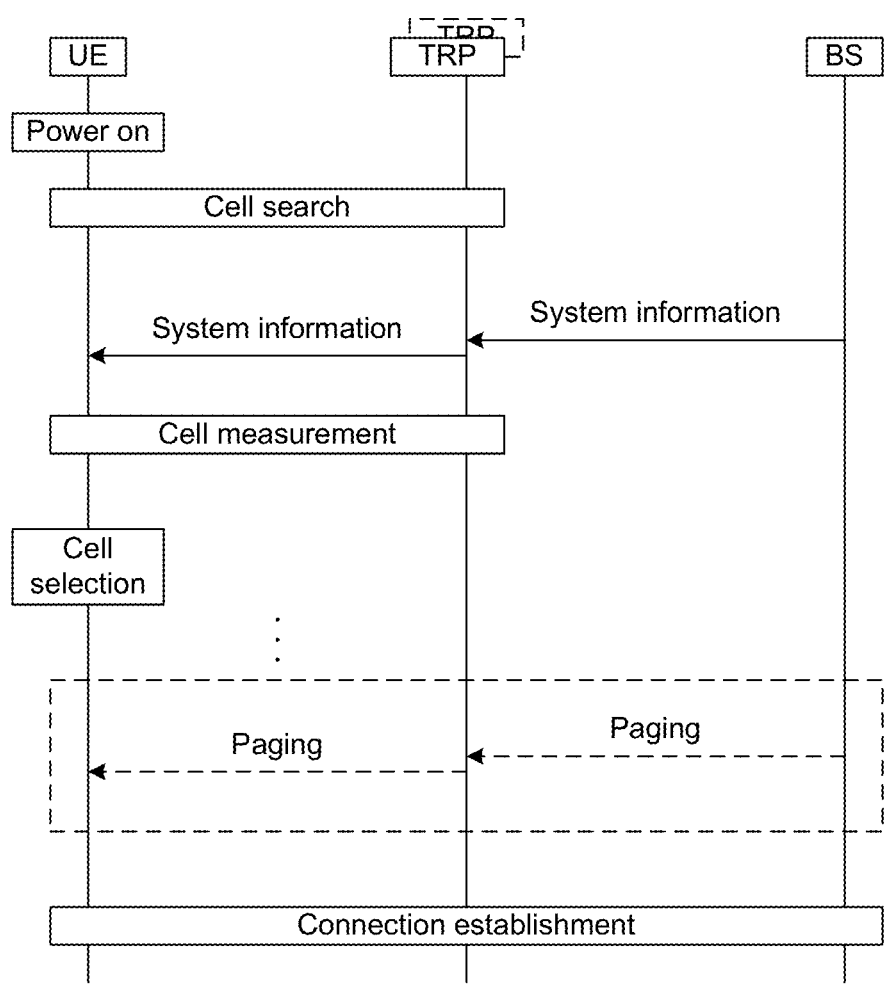
FIG. 13 is an exemplary flow chart for initial access according to one exemplary embodiment.

After a UE powers on, the UE needs to find a cell to camp on. Then, the UE may initiate a connection establishment to network by itself for registration and/or data transmission. Besides, the network could request the UE to initiate a connection establishment to the network via paging, e.g., in order to transmit DL data to the UE. The use case of initial access has the steps as listed below and shown in FIG. 13.

Cell search
: Possible carrier frequencies are scanned to find a cell. The cell provides signaling for UEs to identify the cell, e.g., synchronization signal, by beam sweeping. Different TRPs of the same cell would provide the same signaling at the same time interval(s).

Broadcasted system information acquisition
: The UE acquires necessary parameters, e.g., related to cell selection, from broadcasted system information. The broadcasted system information is provided by beam sweeping.

Cell measurement & selection
: After the UE finds a cell which is possible to camp on, the UE should measure radio condition of the cell and decide whether to camp on the cell based on the measured result. The cell provides signaling for measurement, e.g., reference signal, by beam sweeping. Different TRPs of the same cell would provide the signaling at the same time interval(s).

Paging
: Paging may be required when network would like to transmit UE specific signaling/data and the UE is in non-connected state. When the UE receives paging, the UE should initiate connection establishment to enter connected state for reception.

Connection establishment
: The UE establishes connection to BS via connection establishment procedure. During the procedure, the UE needs to perform random access procedure to let network be aware of the UE and provide resources for UL transmission to UE. After the connection is established, the UE enters connected state. Initial beam(s) to be used for the following transmission(s) would be decided during the procedure.

After the UE camps on a cell, the UE may move among different beams or TRPs of the cell when the UE is in non-connected state, e.g., idle mode. The UE may leave the coverage of the cell and move to coverage of other cell. Mobility for the UE in non-connected state has the following types:

UE beam change
: If UE beamforming is used when the UE is in non-connected state, UE beam(s) may be changed, e.g. due to UE rotation. The UE should keep performing beam sweeping to prevent signaling missing due to UE beam(s) change.

Serving beam or serving TRP change among the same cell
: In the cell UE camps on, the UE is served by TRP(s) who's signaling can be received by the UE. Serving beam(s) of serving TRP(s) may change due to UE mobility. Serving TRP(s) may also change when the UE is moving within camped on cell.

The UE should keep monitoring all possible time intervals for different beams of serving TRP(s), which provides necessary signaling for UEs in non-connected state, to prevent signaling missing.

Cell reselection
: The UE keeps performing measurement on the serving cell where the UE camps on and its neighbor cells, and evaluates whether to reselect the serving cell.

The UE acquires system information of a neighbor cell and reselects the neighbor cell as the new serving cell if the UE determines that the neighbor cell is more optimal. Parameters for evaluation from network are required.

When the UE is in connected state, the UE may move among different beams or TRPs of the same serving cell. Besides, if UE beamforming is used, UE beam(s) may also change over time, e.g. due to UE rotation. A case of mobility in connected state without cell change has the following steps:

Signaling for change detection
: Change of UE beam(s), serving beam(s) of serving TRP(s), and serving TRP(s) may be detected by the UE and/or the network. In order to detect the change, a signaling periodically transmitted by TRP(s) or UE could be used. TRP(s) periodically performs beam sweeping for reception or transmission of the signaling. If UE beamforming is used, the UE periodically performs beam sweeping for reception or transmission of the signaling.

UE beam change
: If the change is detected by the UE, the UE may select proper UE beam(s) for the following reception (and transmission, e.g., for TDD). Alternatively, the UE needs to provide feedback to network and network could provide an indication of UE beam change from the network to the UE.

If the change is detected by network, indication of UE beam change from the network to the UE may be required. The UE uses UE beam(s) indicated by network for the following transmission (and reception, e.g., for TDD).

Serving beam and/or serving TRP change
: After the UE receives the signaling for change detection, the UE needs to provide feedback to network and network could decide whether to change (DL) serving beam(s) and/or serving TRP(s) for the UE. On the other hand, after the TRP(s) receives the signaling for change detection, the network could decide whether to change serving beam(s) and/or serving TRP(s) for the UE.

Figure 14:
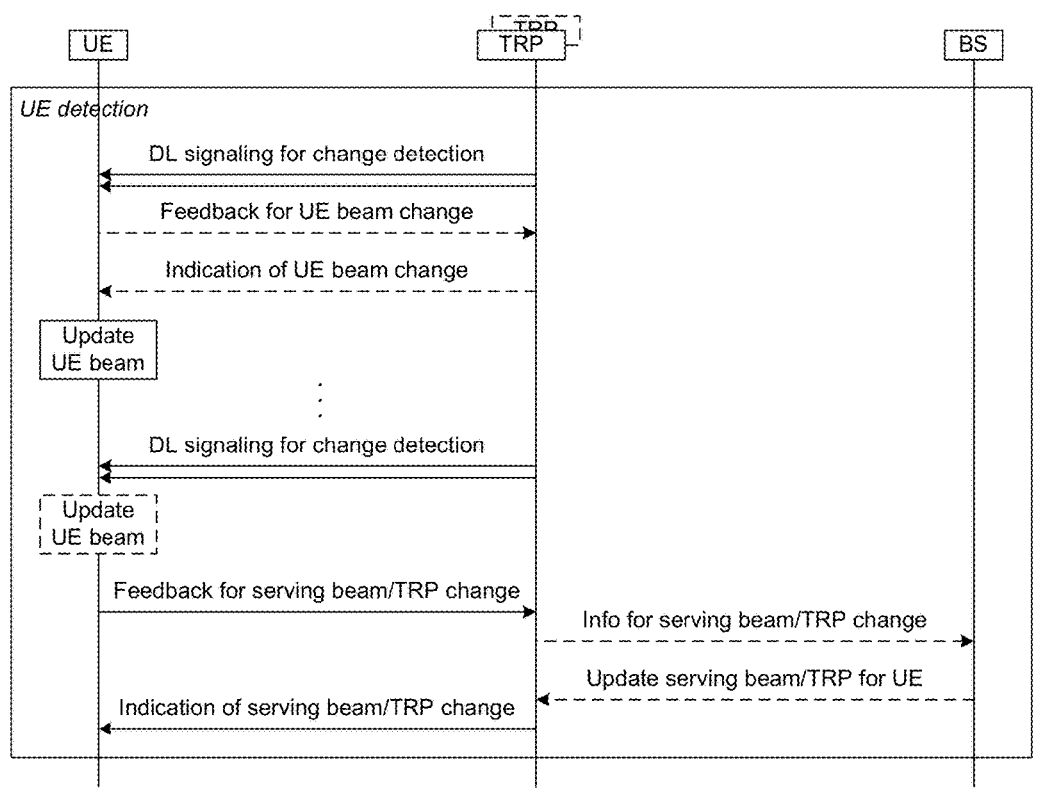
FIG. 14 is an exemplary flow chart for mobility in connected state without cell change based on UE detection according to one exemplary embodiment.
Figure 15:
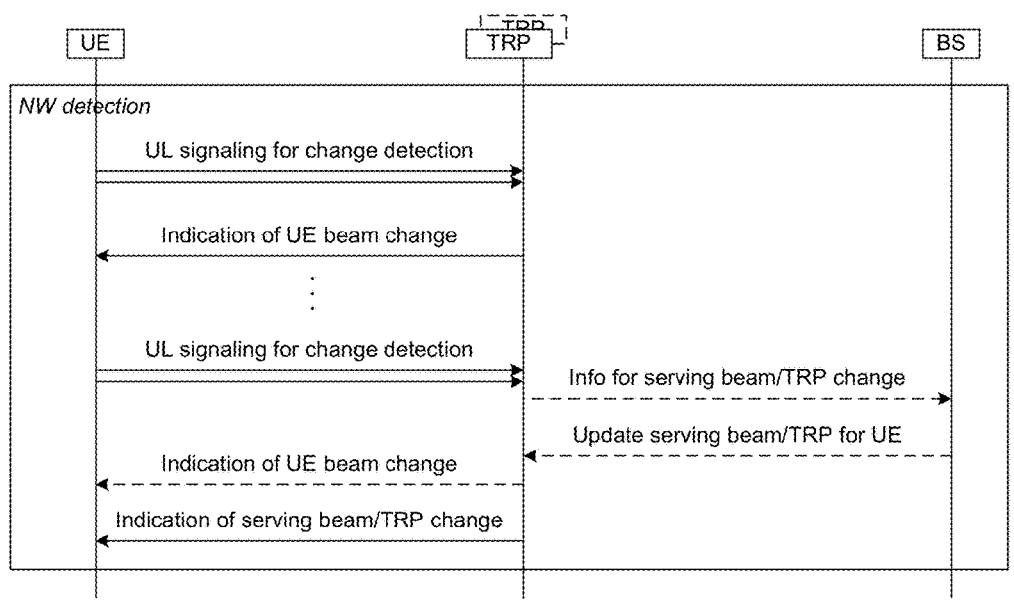
FIG. 15 is an exemplary flow chart for mobility in connected state without cell change based on network detection according to one exemplary embodiment.

FIGS. 14 and 15 illustrate exemplary flow charts for mobility in connected state without cell change.

When the UE is in connected state, the UE may leave the coverage of the serving cell and move to coverage of other cell. It is assumed that the UE needs to perform measurement in order to help detection of cell change. The network would control the change of UE's serving cell, e.g., via handover.

Measurement
: The UE should perform measurement on the serving cell and its neighbor cells to find better serving cell based on measurement configuration. The signaling to be measured is provided by beam sweeping. If UE beamforming is used, the UE performs beam sweeping for reception of the signaling.

In addition, radio quality of serving cell should be kept monitored by the UE in order to detect radio link failure. If a radio link failure is detected, the UE should try to recover the radio link.

Measurement report
: Based on the measurement result, the UE should provide a measurement report to serving BS.

Handover initiation
: Based on the measurement report, the serving BS may decide to handover the UE to a target cell of neighbor BS based on negotiation between the serving BS and neighbor BS. Then, the serving BS would transmit a handover commend indicating a target cell to the UE.

Handover to target cell
: The UE should attempt to connect to the target cell for continuing the ongoing services. Since 0 ms mobility interruption is required, connection between the UE and the source cell should be kept when the UE tries to connect to the target cell. Connection can be released after the UE successfully accesses the target cell. During handover, the UE needs to perform random access procedure to let target cell be aware of the UE.

It is assumed that uplink timing advance is necessary in a NR cell. If the NR cell is composed of multiple TRPs, different uplink timing advance values may be required for uplink transmissions of a UE to different TRPs, e.g., different TRPs may have different sizes of network coverage. The UE may or may not perform beamforming. Then, operations of multiple uplink timing advance values in a cell need to be considered.

It is assumed that UE needs to maintain different timing advance values for different TRPs of the same NR cell and each of maintained timing advances is associated with an identifier, e.g., TA index. Therefore, TA index should be determined, e.g., by the network or by the UE, when the UE receives a new or update of timing advance. Associated TA index may be provided together with timing advance value, e.g., the TA index is included in a Random Access Response.

If TA index is not provided together with timing advance value, e.g., TA index is not included in a Random Access Response because the network may not know which UE would apply the timing advance as well as size of the Random Access Response should be minimized, how to determine TA index needs to be considered. Approaches of determining TA index are described below.

Figure 16:
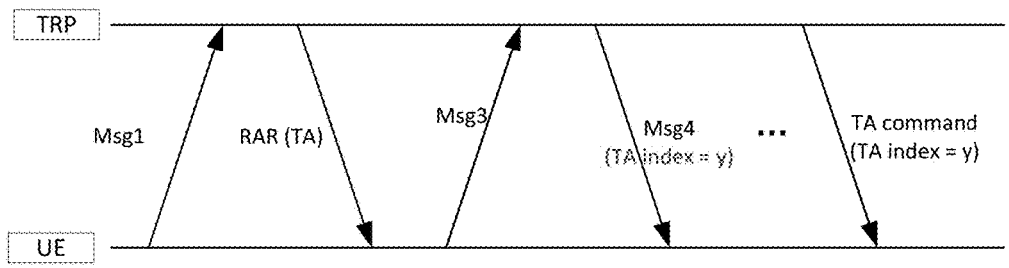
FIG. 16 illustrates an example of TA (Timing Advance) index indicated by Msg4 of RA (Random Access) procedure according to one exemplary embodiment.

One possible approach is to determine TA index by network. Random access procedure is performed by the UE to acquire the initial TA value to access a TRP. TA index associated with the initial TA value is not always needed, e.g., for a cell not requiring multiple TA values or for a very first TA value (e.g., which could be associated with a default or specific TA index). Also, larger Random Access Response size may cause higher loss rate. Besides, since network may not know which UE would apply the initial TA value, other TA value may be wrongly overwritten. So it is assumed that TA index is not included in a Random Access Response. If TA index is determined by network, network needs to know which TA index(es) is maintained by the UE at that time. The alternatives of determining TA index by network are listed below:

One alternative is that TA index could be indicated during RA procedure (e.g., by Msg4). In RA procedure, the UE transmits Msg1 for the TRP to estimate UL timing advance for the UE. Then the TRP transmits RAR which indicates a TA value for the UE. The TA value is used by the UE to transmit Msg3 (which may be used to identify the UE). Afterward, the TRP transmits Msg4 to indicate the TA index which is associated with the TA value indicated by RAR. After RA procedure, the TRP could indicate a TA command with the TA index to the UE to adjust the TA value for the TRP. FIG. 16 illustrates an example of TA index indicated by Msg4 of RA procedure.

Another alternative is that TA index could be indicated after RA procedure.

One possibility is that after the RA procedure, the TRP could transmit a signaling, e.g., (MAC) TA command or RRC message, which includes a new TA index. A new TA index means that the UE is not using this index to maintain TA value(s) for other TRP(s) in the present. Therefore, the UE could associate this new TA index with the TA value from RAR of RA procedure. The signaling can also adjust the TA value at the same time.

Figure 17:
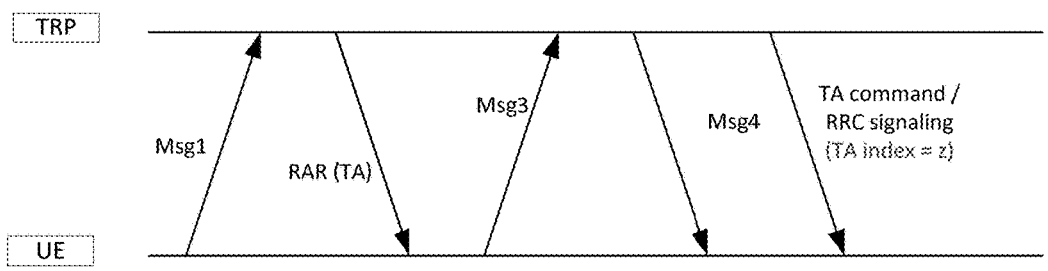
FIG. 17 illustrates an example of TA index indicated by TA command according to one exemplary embodiment.

Another possibility is that after receiving the TA value indicated by RAR (Random Access Response) from a specific TRP or via a specific (UE or TRP) beam, if the UE receives a signaling including a TA index, e.g., (MAC) TA command or RRC message, from the specific TRP or via the specific beam, the UE could associate the TA index with the TA value. The signaling can also adjust the TA value at the same time. FIG. 17 illustrates an example of TA index indicated by TA command (e.g., via MAC or RRC signaling).

Figure 18:
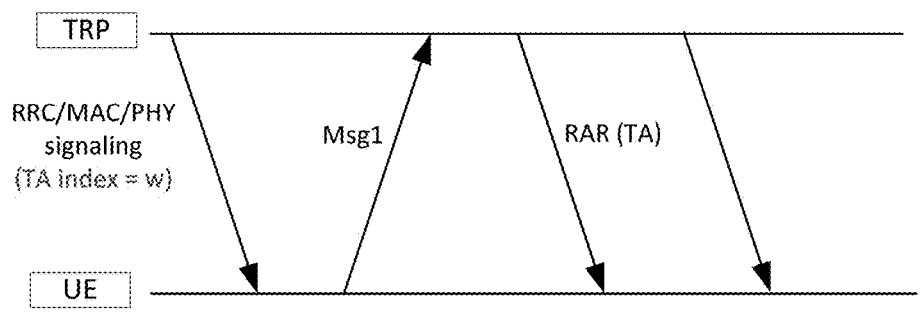
FIG. 18 illustrates an example of TA index indicated by RRC/MAC/PHY signaling according to one exemplary embodiment.

Another alternative is that the associated TA index could be provided to the UE via a signaling before RA procedure. The signaling may be used to trigger the RA procedure, e.g., PDCCH order or signal for beam change. The signaling may be or may not be used to add at least one (serving) TRP or (serving) beam, e.g., TRP or beam to serve the UE. The signaling may indicate a dedicated preamble. The signaling may be a RRC message, MAC signalling, or physical layer signaling. The UE is in connected state or in inactive state. FIG. 18 illustrates an example of TA index indicated by RRC, MAC, or PHY signaling (before RA procedure).

Another possible approach is to determine TA index by UE. Because the UE is aware of which TA index(es) is used to maintain TA value(s), the UE knows the unused TA index(es) by itself. And the UE needs to inform the network which TA index is selected or determined.

The UE could transmit a signaling to indicate the TA index, used to associate with TA value indicated by RAR. The signaling may be a MAC signaling or RRC message. Transmitting the TA index should have higher priority than user data.

Figure 19:
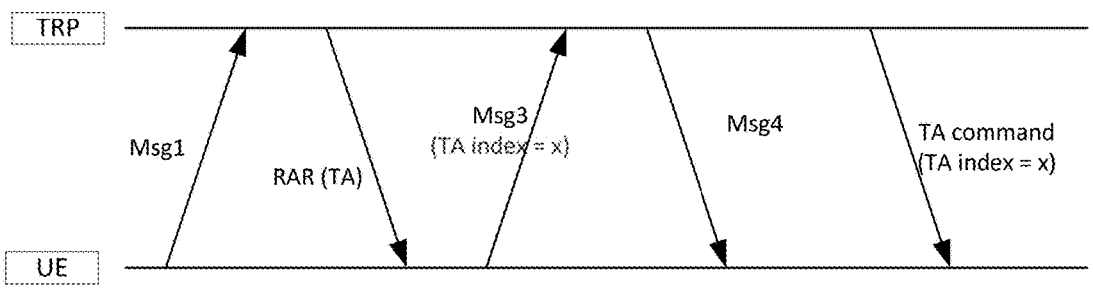
FIG. 19 illustrates an example of TA index indicated by Msg3 of RA procedure according to one exemplary embodiment.

In one alternative, the signaling may be carried by Msg3. Size of UL resources for Msg3 allocated by RAR should take TA index to be included in Msg3 into account. Transmission of the signaling is triggered in response to reception of the TA value indicated by RAR. FIG. 19 illustrates an example of TA index indicated by Msg3 of RA procedure.

Figure 20:
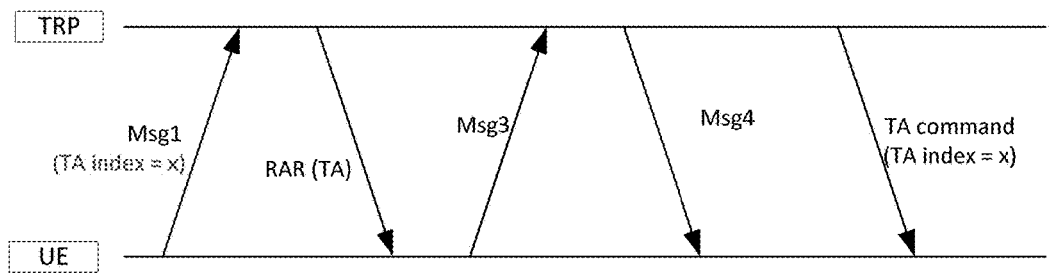
FIG. 20 illustrates an example of TA index indicated by Msg1 of RA procedure according to one exemplary embodiment.

Another alternative is that the signaling may be carried by Msg1 if extra information could be carried by Msg1. Transmission of the signaling is triggered in response to initiation of RA procedure. FIG. 20 illustrates an example of TA index indicated by Msg1 of RA procedure.

Figure 21:
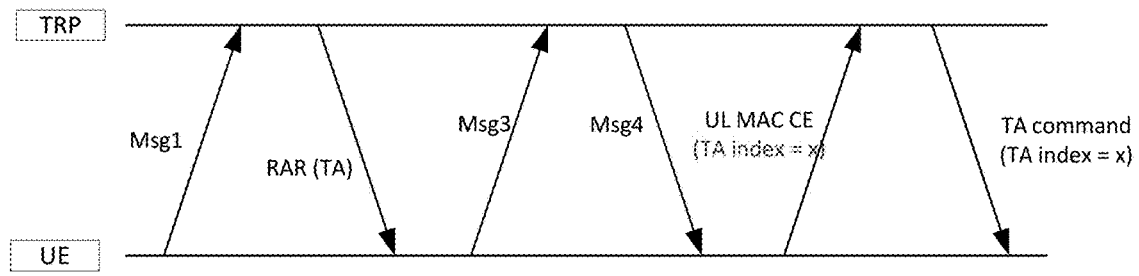
FIG. 21 illustrates an example of TA index indicated by UL (Uplink) MAC (Medium Access Control) control element according to one exemplary embodiment.

The third alternative is that the signaling may be transmitted after RA procedure. Msg4 of RA procedure could provide the UL grant for transmission of the signaling. Transmission of the signaling is triggered in response to successful completion of RA procedure. FIG. 21 illustrates an example of TA index indicated by UL MAC control element.

Figure 22:
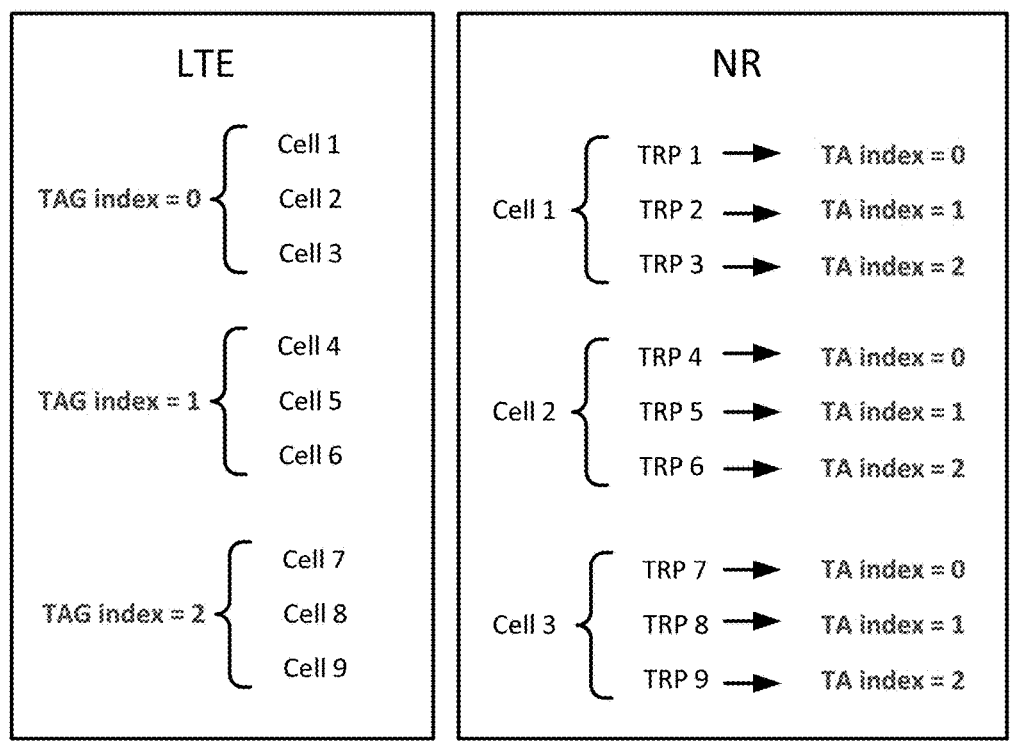
FIG. 22 is a diagram according to one exemplary embodiment.

In LTE, some serving cells are grouped in a timing advance group (TAG), and are indicated with the same index. Each TAG contains at least one serving cell with configured uplink, and the mapping of each serving cell to a TAG is configured by RRC. The UE could know which cell(s) is associated with which TAG based on configuration. However, the mechanism of NR TA index is a kind of difference from LTE TAG index. NR TA index may have one or more of following differences comparing with LTE TAG index (as illustrated in FIG. 22):

TA index could be mapped to TRP(s) of a cell.

TA index could be mapped to or associated with some serving beam(s), non-serving beam(s), and/or beam pair link(s) of a cell. A beam or a set of beams could be associated with a DL reference signaling. The beam or the set of beams could be indicated or represented based on an index associated with the DL reference signaling. The DL reference signaling could be a synchronization signal or a channel state information reference signal.

The mapping or association of a TA index to TRP(s), timing advance, serving beam(s), non-serving beam(s), and/or beam pair link(s) could be configured by RRC (signal).

The mapping or association of a TA index to TRP(s), timing advance, serving beam(s), non-serving beam(s), and/or beam pair link(s) may not be configured by RRC, e.g. could be configured by MAC signal or PHY signal.

The mapping or association of a TA index to TRP(s), timing advance, serving beam(s), non-serving beam(s), and/or beam pair link(s) could be configured by a signal for beam change.

The same TRP may not always be associated with the same TA index, which may be dynamically updated.

If the UE receives the mapping or association of a TA index and the TA index is not associated with a valid timing advance (e.g. the TA index is a new index or a validity timer associated with the TA index expires), the UE could initiate a Random Access procedure to acquire a valid timing advance associated with the TA index.

If the UE receives the mapping or association of a TA index and the TA index is associated with a valid timing advance (e.g., the TA index is already maintained by the UE and/or a validity timer associated with the TA index is running), the UE may not need to initiate a Random Access procedure to acquire a timing advance associated with the TA index.

For beam management, a UE may detect qualified beam(s) or DL beam pair link(s) by measuring the DL reference signals transmitted from beams of a cell and report the qualified beam(s) or DL beam pair link(s) to gNB (which may include a UE Rx beam and a gNB Tx beam). It is also possible that a UE may transmit UL reference signals for gNB to detect qualified beam(s) or UL beam pair link(s) (which may include a UE Tx beam and a gNB Rx beam). The gNB may then send a signal to associate a beam or a beam pair link with a TA index. With the associated TA index of a beam or beam pair link, the UE could know which TA value to apply to an UL transmission when an UL grant is scheduled for a UL transmission on the beam or the beam pair link. The signal (e.g., for beam change and/or beam addition) could also be used to change or add serving beam(s) and/or beam pair link(s) (e.g. a communication link composed of UE beam(s) and network beam(s)). This signal could trigger a RA procedure on specific UE beam(s), specific network beam(s), and/or specific beam pair link(s), e.g., if the TA index is a new index or not present in the UE for the cell. The signal could trigger a transmission of RA preamble(s) via specific UE beam(s), specific network beam(s), and/or specific beam pair link(s). The signal could also indicate a preamble to be transmitted by the UE.

For a UE, the TA index may be unique within one serving cell but could be reused in different serving cells.

Figure 27:
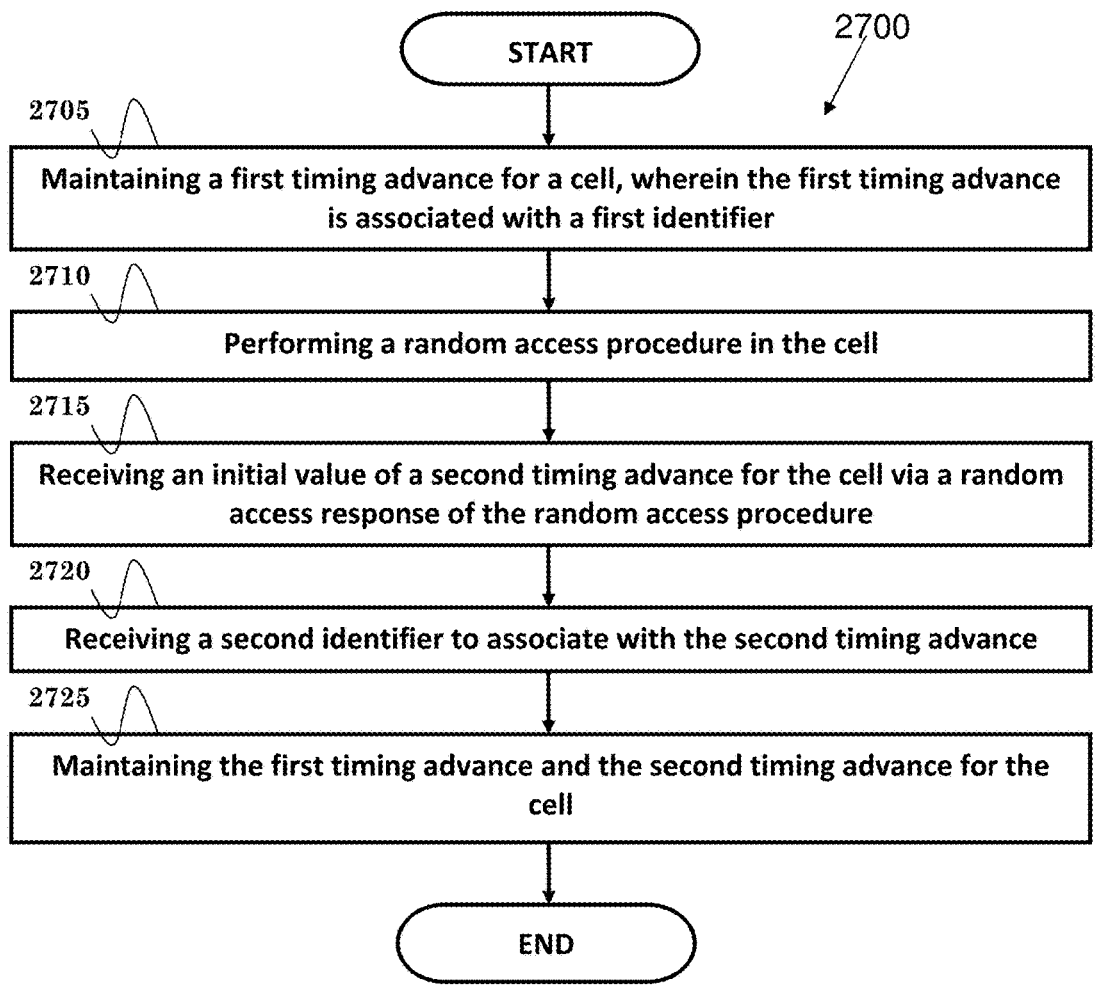
FIG. 27 is a flow chart according to one exemplary embodiment.

FIG. 27 is a flow chart 2700 according to one exemplary embodiment from the perspective of a UE. In step 2705, the UE maintains a first timing advance for a cell, wherein the first timing advance is associated with a first identifier. In step 2710, the UE performs a random access procedure in the cell. In step 2715, the UE receives an initial value of a second timing advance for the cell via a random access response of the random access procedure. In step 2720, the UE receives a second identifier to associate with the second timing advance. In step 2725, the UE maintains the first timing advance and the second timing advance for the cell.

In one embodiment, the second identifier could be received together with the initial value for the second timing advance. The second identifier could be received via a contention resolution of the random access procedure. The second identifier could be received via a signaling used to trigger the random access procedure. The second identifier could be received via a signaling used to add at least one serving beam. The signaling could indicate a dedicated preamble.

In one embodiment, the UE could receive a first timing advance command with the first identifier to adjust the first timing advance. The UE could receive a second timing advance command with the second identifier to adjust the second timing advance. Furthermore, the UE could apply the first timing advance to adjust timing of a first UL transmission associated with the first timing advance. The UE could also apply the second timing advance to adjust timing of a second UL transmission associated with the second timing advance.

Referring back to FIGS. 3 and 4, in one exemplary embodiment of a UE, the device 300 includes a program code 312 stored in the memory 310. The CPU 308 could execute program code 312 to enable the UE (i) to maintain a first timing advance for a cell, wherein the first timing advance is associated with a first identifier, (ii) to perform a random access procedure in the cell, (iii) to receive an initial value of a second timing advance for the cell via a random access response of the random access procedure, (iv) to receive a second identifier to associate with the second timing advance, and (v) to maintain the first timing advance and the second timing advance for the cell. Furthermore, the CPU 308 can execute the program code 312 to perform all of the above-described actions and steps or others described herein.

Figure 28:
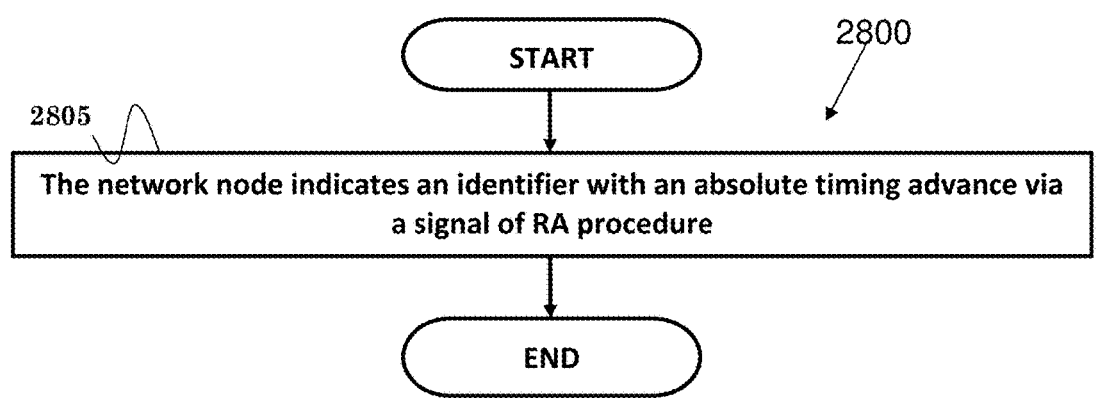
FIG. 28 is a flow chart according to one exemplary embodiment.

FIG. 28 is a flow chart 2800 according to one exemplary embodiment from the perspective of a network node. In step 2805, the network node indicates an identifier with an absolute timing advance via a signal of RA procedure.

Referring back to FIGS. 3 and 4, in one exemplary embodiment of a network node, the device 300 includes a program code 312 stored in the memory 310. The CPU 308 could execute program code 312 to enable the network node to indicate an identifier with an absolute timing advance via a signal of RA procedure. Furthermore, the CPU 308 can execute the program code 312 to perform all of the above-described actions and steps or others described herein.

Figure 29:
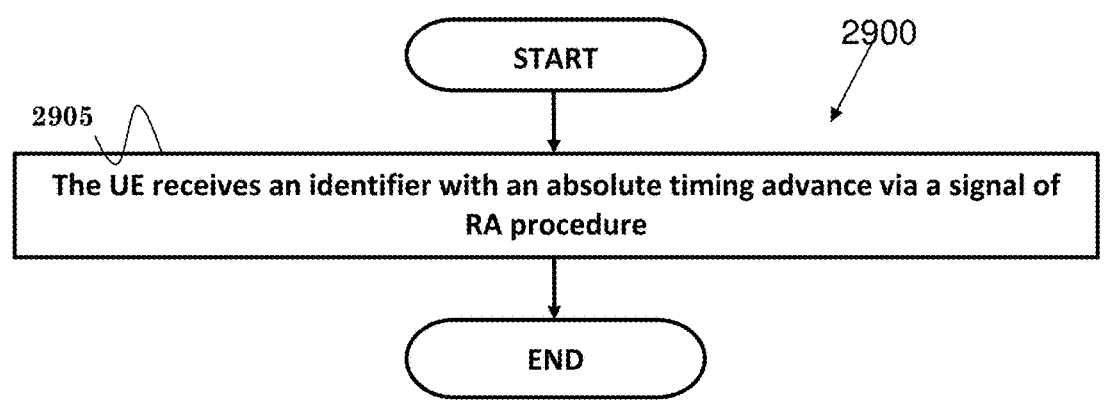
FIG. 29 is a flow chart according to one exemplary embodiment.

FIG. 29 is a flow chart 2900 according to one exemplary embodiment from the perspective of a UE. In step 2905, the UE receives an identifier with an absolute timing advance via a signal of RA procedure.

Referring back to FIGS. 3 and 4, in one exemplary embodiment of a UE, the device 300 includes a program code 312 stored in the memory 310. The CPU 308 could execute program code 312 to enable the UE to receive an identifier with an absolute timing advance via a signal of RA procedure. Furthermore, the CPU 308 can execute the program code 312 to perform all of the above-described actions and steps or others described herein.

In one embodiment, the identifier could be transmitted together with the absolute timing advance. The signal could be Msg2 or RAR (Random Access Response). The signal could also be used to respond preamble transmission (Msg1). Furthermore, the signal could be used to include result of timing advance estimation.

Figure 30:
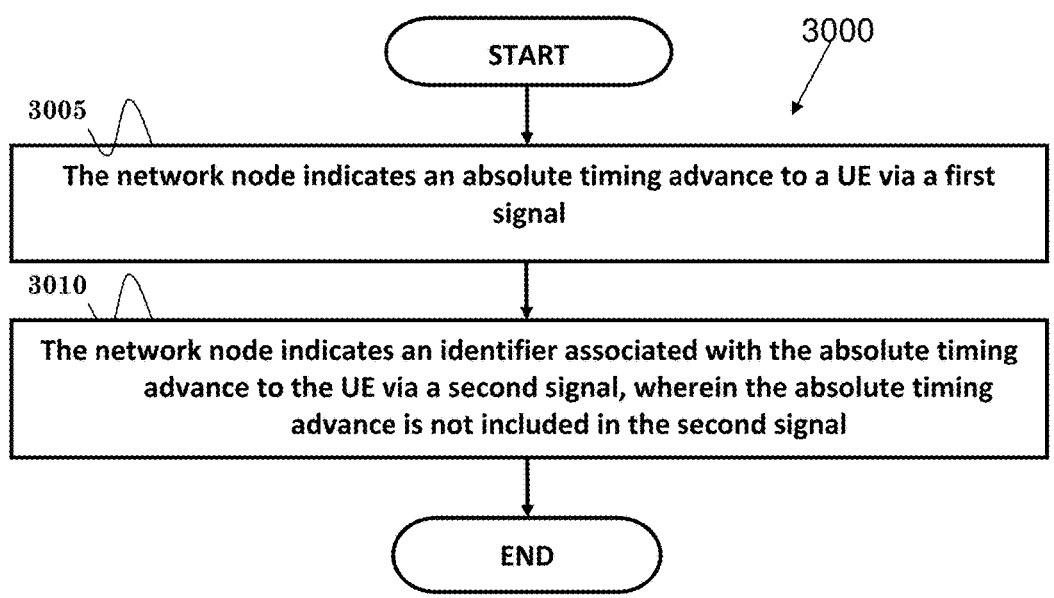
FIG. 30 is a flow chart according to one exemplary embodiment.

FIG. 30 is a flow chart 3000 according to one exemplary embodiment from the perspective of a network node. In step 3005, the network node indicates an absolute timing advance to a UE via a first signal. In step 3010, the network node indicates an identifier associated with the absolute timing advance to the UE via a second signal, wherein the absolute timing advance is not included in the second signal.

Referring back to FIGS. 3 and 4, in one exemplary embodiment of a network node, the device 300 includes a program code 312 stored in the memory 310. The CPU 308 could execute program code 312 to enable the network node (i) to indicate an absolute timing advance to a UE via a first signal, and (ii) to indicate an identifier associated with the absolute timing advance to the UE via a second signal, wherein the absolute timing advance is not included in the second signal. Furthermore, the CPU 308 can execute the program code 312 to perform all of the above-described actions and steps or others described herein.

Figure 31:
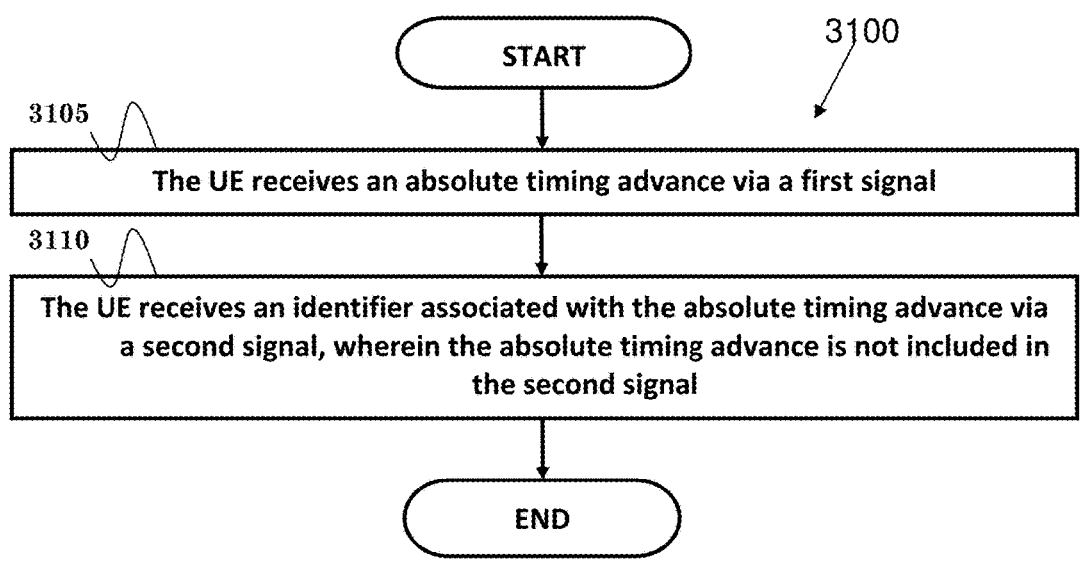
FIG. 31 is a flow chart according to one exemplary embodiment.

FIG. 31 is a flow chart 3100 according to one exemplary embodiment from the perspective of a UE. In step 3105, the UE receives an absolute timing advance via a first signal. In step 3110, the UE receives an identifier associated with the absolute timing advance via a second signal, wherein the absolute timing advance is not included in the second signal.

Referring back to FIGS. 3 and 4, in one exemplary embodiment of a UE, the device 300 includes a program code 312 stored in the memory 310. The CPU 308 could execute program code 312 to enable the UE (i) to receive an absolute timing advance via a first signal, and (ii) to receive an identifier associated with the absolute timing advance via a second signal, wherein the absolute timing advance is not included in the second signal. Furthermore, the CPU 308 can execute the program code 312 to perform all of the above-described actions and steps or others described herein.

In the context of the embodiments shown in FIGS. 30-31 and discussed above, in one embodiment, the second signal could be a signal of RA procedure (e.g., Msg4). The second signal could be a MAC signaling (e.g., TA command or MAC control element). The MAC signaling could carry a timing advance value. The second signal could be a RRC signaling or a PHY signaling (e.g., PDCCH order). The second signal could be used to trigger a RA procedure. The second signal could be used to indicate a dedicated preamble. Alternatively or additionally, the second signal could be used to add at least one TRP, and/or to add at least one beam. In addition, the second signal may or may not include a relative timing advance.

In one embodiment, the first signal could be a Msg2 (RAR) of RA procedure. Alternatively or additionally, the first signal could be a MAC signaling.

In one embodiment, the identifier could be determined by the network node. The network node indicating the identifier to the UE could mean that the network transmits a DL signal including the identifier to the UE. The UE receiving the identifier from the network node could mean that the UE receives a DL signal including the identifier from the network node.

In one embodiment, the network node is aware of the UE is maintaining which identifier(s). When the UE receives the identifier, the UE associates the identifier with the timing advance.

Figure 32:
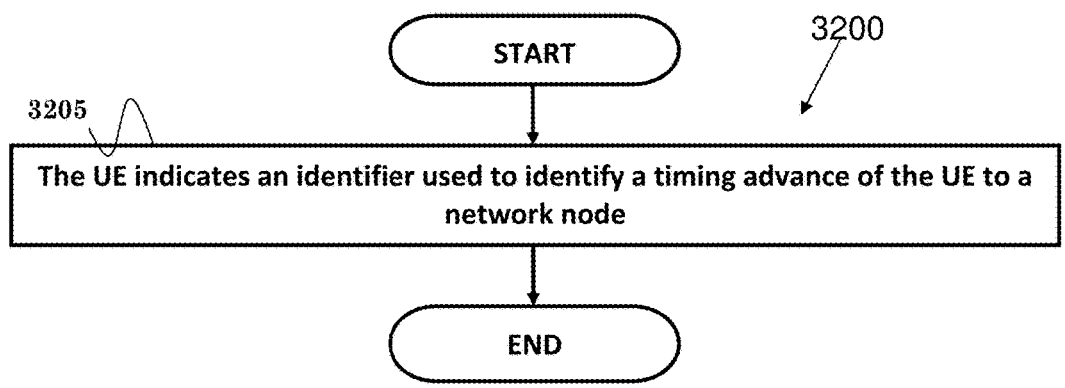
FIG. 32 is a flow chart according to one exemplary embodiment.

FIG. 32 is a flow chart 3200 according to one exemplary embodiment from the perspective of a UE. In step 3205, the UE indicates an identifier used to identify a timing advance of the UE to a network node.

Referring back to FIGS. 3 and 4, in one exemplary embodiment of a UE, the device 300 includes a program code 312 stored in the memory 310. The CPU 308 could execute program code 312 to enable the UE to indicate an identifier used to identify a timing advance of the UE to a network node. Furthermore, the CPU 308 can execute the program code 312 to perform all of the above-described actions and steps or others described herein.

Figure 33:
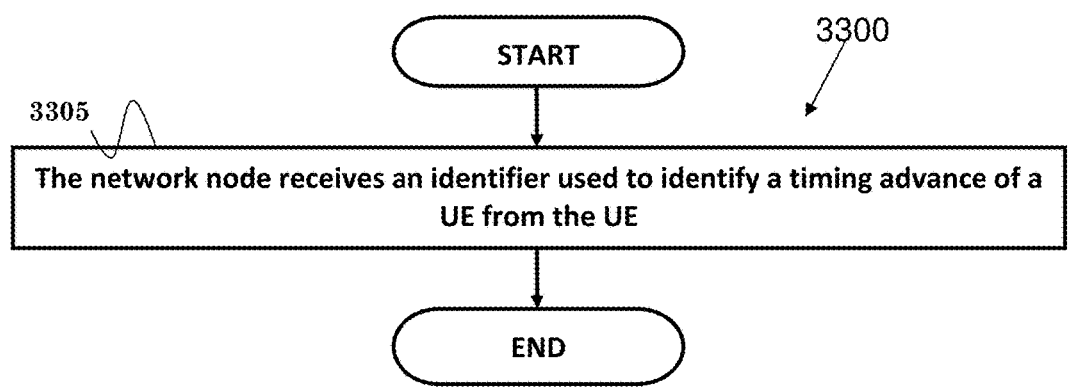
FIG. 33 is a flow chart according to one exemplary embodiment.

FIG. 33 is a flow chart 3300 according to one exemplary embodiment from the perspective of a network node. In step 3305, the network node receives an identifier used to identify a timing advance of a UE from the UE.

Referring back to FIGS. 3 and 4, in one exemplary embodiment of a network node, the device 300 includes a program code 312 stored in the memory 310. The CPU 308 could execute program code 312 to enable the network node to receive an identifier used to identify a timing advance of a UE from the UE. Furthermore, the CPU 308 can execute the program code 312 to perform all of the above-described actions and steps or others described herein.

In one embodiment, the identifier could be determined by the UE. The UE is able to select an unused identifier to indicate. The UE indicating the identifier to the network node could mean that the UE transmits a UL signal including the identifier to the network node.

In one embodiment, the identifier could be transmitted via a signal of RA procedure (e.g., Msg1 or Msg3). The identifier could be transmitted via a MAC signaling (e.g., MAC control element).

If the timing advance has not been indicated by any identifier, the identifier of the timing advance could be set as a default value. The identifier associated with the timing advance could mean that the identifier can be used to adjust and/or control the timing advance. The identifier associated with the timing advance could mean that the identifier is mapped to the timing advance.

In one embodiment, the identifier could be a number, an identity, an index, an index list, or a bit map. The identifier could be associated with the timing advance for at least one network node. In one embodiment, the identifier could be transmitted with information of the network node (e.g., network node ID or beam ID).

In one embodiment, mapping or association of the identifier and the network node/timing advance is not configured by RRC. The identifier could be dynamically updated.

In one embodiment, the timing advance could be indicated by a Msg2 or a RAR of RA procedure. In one embodiment, the timing advance could be updated by a TA command, wherein the TA command is a MAC control element transmitted by the network node. The timing advance could be a timing advance value used to advance or delay timing of UL transmission to the network node. The timing advance could be a timing advance value used to compensate for propagation delay.

In one embodiment, the timing advance could be maintained for the network node of a cell. The timing advance is maintained for the network node could mean that the timing advance can be used when the UE performs UL transmission to the network node. The timing advance could also be maintained by the network node, wherein the network node could transmit a signal to adjust timing of UL transmission of the UE. In one embodiment, the timing advance could be maintained by the UE, wherein the UE could apply the timing advance to adjust timing of UL transmission.

In one embodiment, the timing advance could be an absolute timing advance or a relative timing advance. The absolute timing advance could be included in RAR. In one embodiment, the absolute timing advance could be an initial or an exact timing advance value. The absolute timing advance could comprise result of timing advance estimation by network. The absolute timing advance could be different from a relative timing advance.

In one embodiment, the relative timing advance could be included in a (TA) MAC control element. In one embodiment, the relative timing advance could be utilized to adjust timing advance. Length of the absolute timing advance could be larger than length of the relative timing advance.

In one embodiment, the UE could maintain multiple timing advances simultaneously. Network nodes of a cell could be grouped into different sets, wherein the UE uses the same timing advance for UL transmissions to the same set. The UE could maintain different timing advances for different network nodes or for different groups of network nodes. The UE transmits the UL signal via UE beam sweeping.

In one embodiment, the RA procedure could be a two-step RA procedure or a four-step RA procedure.

In one embodiment, the cell could comprise multiple network nodes. The cell could also comprise multiple timing advances for a UE. The network node could be a central unit (CU), a distributed unit (DU), a transmission/reception point (TRP), a base station (BS), a 5G node, or a gNB.

In one embodiment, the UE is capable of using UE beamforming. The UE does not use UE beamforming if the cell does not support (or allow) UE beamforming. The UE could use beam sweeping for transmission and/or for reception. Alternatively, the UE may not use beam sweeping for transmission and/or for reception.

Based on the invention, an identifier for timing advance (e.g., TA index) is able to be identified and be indicated by a network or a UE. Then, the network could use the identifier to control and/or adjust timing advance of the UE.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a UE (User Equipment) to maintain timing advances for multiple network nodes in a cell of a wireless communication system, comprising:
    maintaining a first timing advance for the cell, wherein the first timing advance is associated with a first identifier;
    performing a random access procedure in the cell;
    receiving an initial value of a second timing advance for the cell via a random access response of the random access procedure;
    receiving a second identifier to associate with the second timing advance; and
    adjusting the first timing advance if a first timing advance command with the first identifier is received and adjusting the second timing advance if a second timing advance command with the second identifier is received.

2. The method of claim 1, wherein the second identifier is received together with the initial value for the second timing advance.

3. The method of claim 1, wherein the second identifier is received via a contention resolution of the random access procedure.

4. The method of claim 1, wherein the second identifier is received via a signaling used to trigger the random access procedure.

5. The method of claim 4, wherein the signaling indicates a dedicated preamble.

6. The method of claim 1, wherein the second identifier is received via a signaling used to add at least one serving beam.

7. The method of claim 1, wherein the first timing advance is used for at least a first network node of the multiple network nodes in the cell, and the second timing advance is used for at least a second network node of the multiple network nodes in the cell.

8. The method of claim 1, wherein the UE applies the first timing advance to adjust timing of a first UL transmission associated with the first timing advance.

9. The method of claim 1, wherein the UE applies the second timing advance to adjust timing of a second UL transmission associated with the second timing advance.

10. A User Equipment (UE) to maintain timing advances for multiple network nodes in a cell of a wireless communication system, comprising:
    a control circuit;
    a processor installed in the control circuit; and
    a memory installed in the control circuit and operatively coupled to the processor;
    wherein the processor is configured to execute a program code stored in the memory to:
        maintain a first timing advance for the cell, wherein the first timing advance is associated with a first identifier;
        perform a random access procedure in the cell;
        receive an initial value of a second timing advance for the cell via a random access response of the random access procedure;
        receive a second identifier to associate with the second timing advance; and
        adjust the first timing advance if a first timing advance command with the first identifier is received and adjust the second timing advance if a second timing advance command with the second identifier is received.

11. The UE of claim 10, wherein the second identifier is received together with the initial value for the second timing advance.

12. The UE of claim 10, wherein the second identifier is received via a contention resolution of the random access procedure.

13. The UE of claim 10, wherein the second identifier is received via a signaling used to trigger the random access procedure.

14. The UE of claim 13, wherein the signaling indicates a dedicated preamble.

15. The UE of claim 10, wherein the second identifier is received via a signaling used to add at least one serving beam.

16. The UE of claim 10, wherein the first timing advance is used for at least a first network node of the multiple network nodes in the cell, and the second timing advance is used for at least a second network node of the multiple network nodes in the cell.

17. The UE of claim 10, wherein the processor is further configured to execute the program code stored in the memory to:
    apply the first timing advance to adjust timing of a first UL transmission associated with the first timing advance.

18. The UE of claim 10, wherein the processor is further configured to execute the program code stored in the memory to:
    apply the second timing advance to adjust timing of a second UL transmission associated with the second timing advance.

* * * * *